(12) United States Patent
Shiba

(10) Patent No.: US 12,105,378 B2
(45) Date of Patent: Oct. 1, 2024

(54) LIGHT DIFFUSION SHEET, BACKLIGHT UNIT, LIQUID CRYSTAL DISPLAY DEVICE, INFORMATION APPARATUS, AND METHOD FOR MANUFACTURING LIGHT DIFFUSION SHEET

(71) Applicant: KEIWA Incorporated, Tokyo (JP)

(72) Inventor: Satoshi Shiba, Tokyo (JP)

(73) Assignee: KEIWA INCORPORATED, Tokyo (JP)

(*) Notice: Subject to any disclaimer, the term of this patent is extended or adjusted under 35 U.S.C. 154(b) by 0 days.

(21) Appl. No.: 18/405,444

(22) Filed: Jan. 5, 2024

(65) Prior Publication Data

US 2024/0134228 A1 Apr. 25, 2024
US 2024/0231149 A9 Jul. 11, 2024

Related U.S. Application Data

(63) Continuation of application No. PCT/JP2022/020856, filed on May 19, 2022.

(30) Foreign Application Priority Data

Jul. 7, 2021 (JP) .................................. 2021-112634

(51) Int. Cl.
| | |
|---|---|
| G02F 1/00 | (2006.01) |
| G02F 1/1335 | (2006.01) |
| G02F 1/13357 | (2006.01) |

(52) U.S. Cl.
CPC .. *G02F 1/133607* (2021.01); *G02F 1/133603* (2013.01); *G02F 1/133611* (2013.01)

(58) Field of Classification Search
None
See application file for complete search history.

(56) References Cited

U.S. PATENT DOCUMENTS

| | | | |
|---|---|---|---|
| 2008/0013323 A1 | 1/2008 | Katsumoto et al. | |
| 2008/0158880 A1 | 7/2008 | Ito | |
| 2011/0317096 A1 | 12/2011 | Yokota et al. | |
| 2013/0314944 A1* | 11/2013 | McCollum | G02B 6/0036 |
| | | | 362/608 |

(Continued)

FOREIGN PATENT DOCUMENTS

| | | |
|---|---|---|
| JP | 2004-342587 A | 12/2004 |
| JP | 2008-003232 A | 1/2008 |
| JP | 2008-166057 A | 7/2008 |

(Continued)

OTHER PUBLICATIONS

International Search Report and Written opinion for PCT/JP2022/020856 (ISA/JP) mailed Jul. 19, 2022 w/English translation (10 pages).

*Primary Examiner* — Gerald J Sufleta, II
(74) *Attorney, Agent, or Firm* — Alston & Bird LLP

(57) ABSTRACT

A first surface 21a of a light diffusion sheet 43 has a light diffuser 43A provided with a plurality of recesses 22 arrayed two-dimensionally and a plurality of luminance enhancers 43B that is flatter than the light diffuser 43A. The plurality of luminance enhancers 43B is provided in a gradation pattern such that the arrangement density is higher in a region where the luminance is lower in the luminance distribution generated by the plurality of point light sources 42 when the plurality of recesses 22 is formed all over the first surface 21a.

15 Claims, 14 Drawing Sheets

(56) References Cited

U.S. PATENT DOCUMENTS

2023/0132319 A1* 4/2023 Fu .................... G02F 1/133605
    362/97.1
2023/0152626 A1* 5/2023 Nishikawa ........ G02F 1/133605
    349/62

FOREIGN PATENT DOCUMENTS

| JP | 2009-238491 A | 10/2009 |
| JP | 2010-277983 A | 12/2010 |
| JP | 2011-129277 A | 6/2011 |
| JP | 2012-018880 A | 1/2012 |

* cited by examiner

FIG.8
(a)
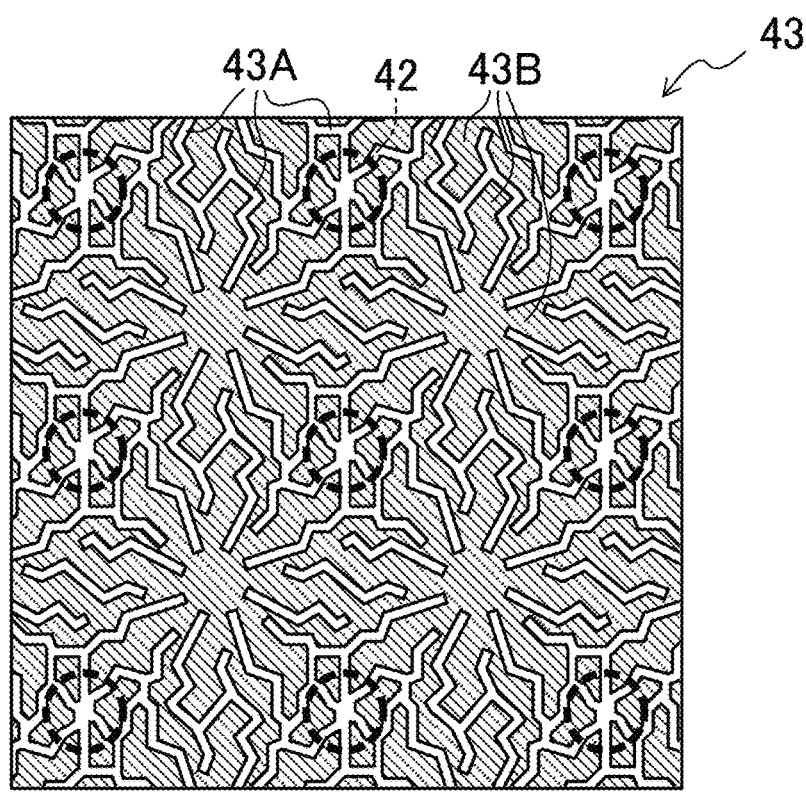
(b)
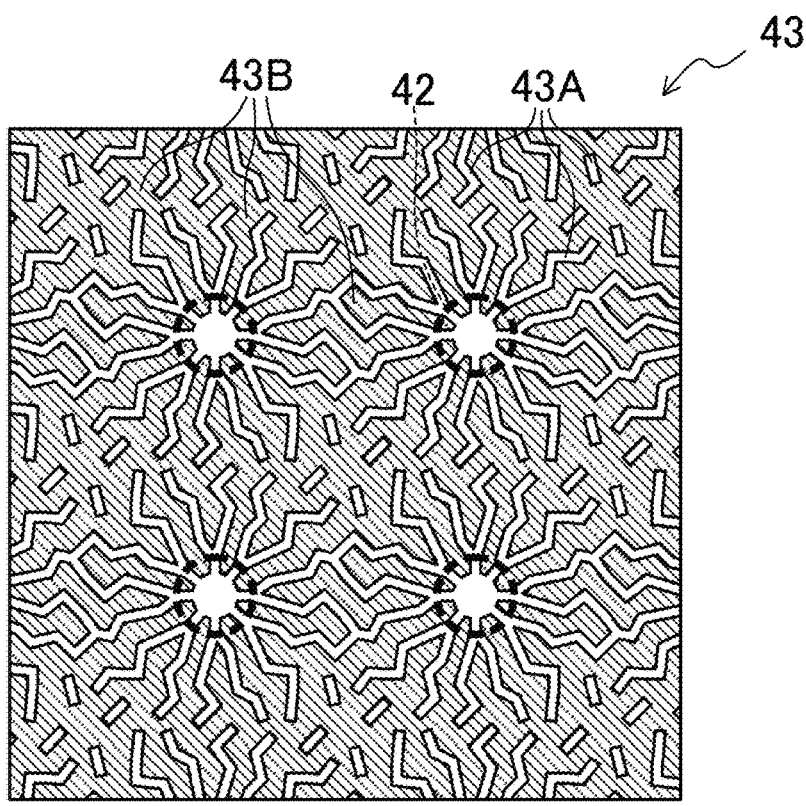

FIG.9
(a)
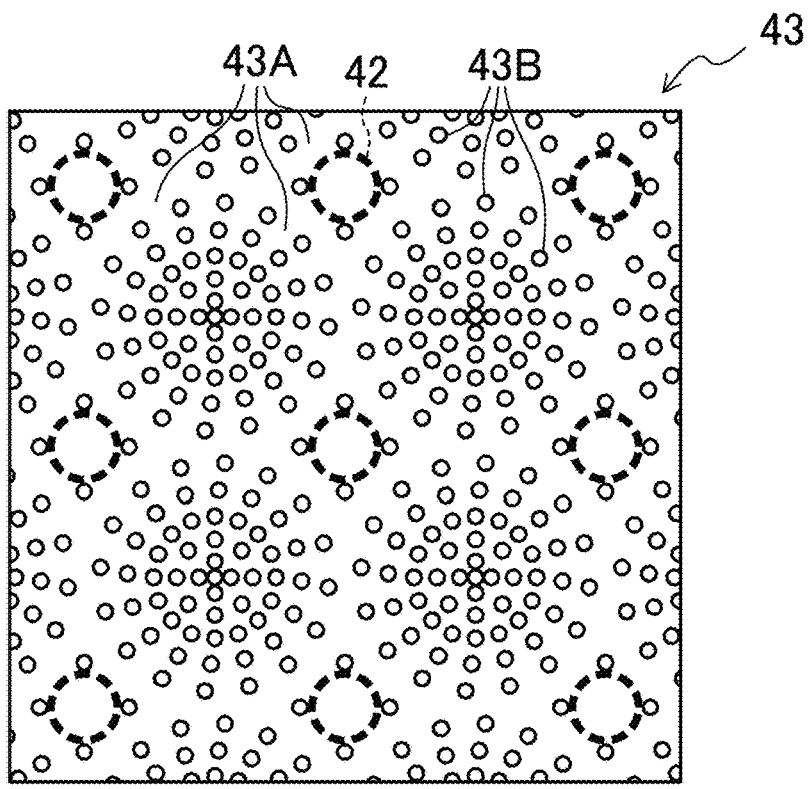
(b)
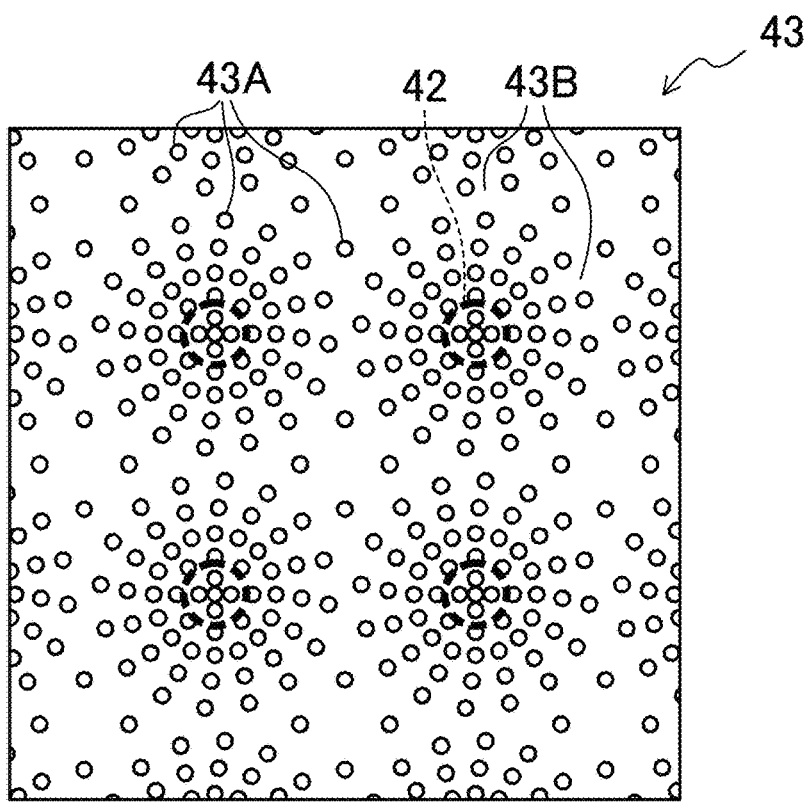

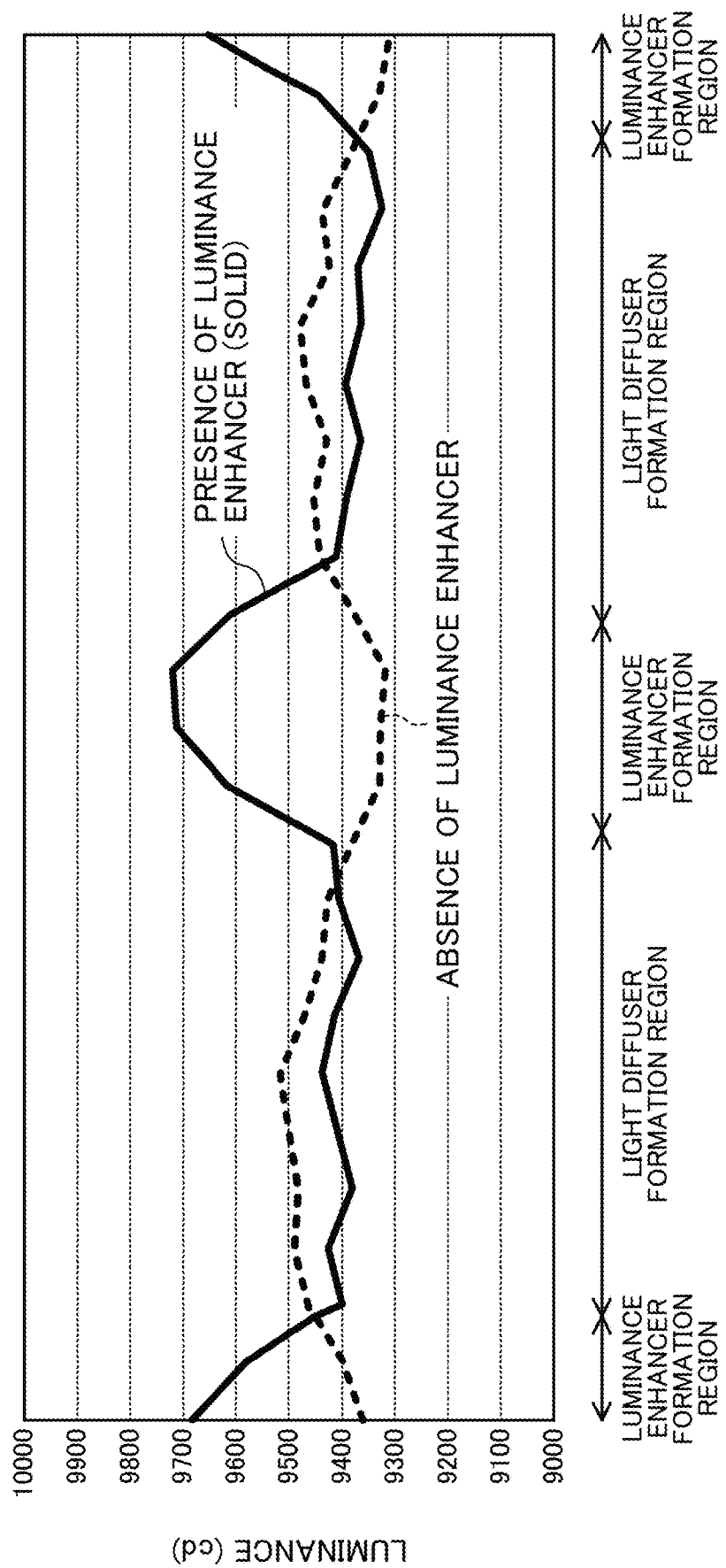

LIGHT DIFFUSION SHEET, BACKLIGHT UNIT, LIQUID CRYSTAL DISPLAY DEVICE, INFORMATION APPARATUS, AND METHOD FOR MANUFACTURING LIGHT DIFFUSION SHEET

CROSS REFERENCE TO RELATED APPLICATIONS

This application is a bypass continuation of International Application No. PCT/JP2022/020856, filed May 19, 2022, which international application claims priority to and the benefit of Japanese Application No. 2021-112634, filed Jul. 7, 2021; the contents of both of which as are hereby incorporated by reference herein in their respective entireties.

BACKGROUND

The present disclosure relates to a light diffusion sheet, a backlight unit, a liquid crystal display device, an information apparatus, and a method for manufacturing the light diffusion sheet.

Liquid crystal display devices are widely used as display devices of various information apparatuses such as smartphones and tablet terminals. As a backlight of a liquid crystal display device, a direct type in which a light source is disposed on a back surface of a liquid crystal panel or an edge light type in which a light source is disposed near a side surface of a liquid crystal panel is mainly used.

When a direct backlight is adopted, a light diffusion member (light diffusion plate, light diffusion sheet, or light diffusion film) is used in order to improve uniformity of in-plane luminance by erasing an image of a light source such as a light emitting diode (LED) on a light emitting surface.

In a direct backlight disclosed in Patent Literature 1, a light source, a light diffusion sheet, and a prism sheet are stacked in that order from a back surface side of a liquid crystal display panel.

Patent Literature 1: JP 2011-129277 A

SUMMARY

However, in the conventional direct backlight, a decrease in luminance may occur in an inter-light source region (a region where no light source is disposed) or the like along with a decrease in thickness due to a decrease in thickness of the light diffusion sheet or a distance between the light source and the light diffusion sheet, or a decrease in the number of light source for cost reduction.

Meanwhile, an attempt has been made to print a white ink that reflects light on a region immediately above the light source of the light diffusion sheet and decrease the luminance of the region immediately above the light source to eliminate luminance unevenness occurring between the region immediately above the light source and the inter-light source region. However, in this case, decrease in luminance of the entire screen cannot be avoided.

An object of the present disclosure is to provide a light diffusion sheet capable of improving luminance uniformity while avoiding a decrease in luminance of an entire screen in a liquid crystal display device.

A light diffusion sheet of the present disclosure is a light diffusion sheet incorporated in a liquid crystal display device in which a plurality of point light sources is dispersedly provided on a back surface side of a display screen. At least a first surface of the light diffusion sheet of the present disclosure has a light diffuser provided with a plurality of recesses arrayed two-dimensionally and a plurality of luminance enhancers that is flatter than the light diffuser. The plurality of luminance enhancers is provided in a gradation pattern such that an arrangement density is higher in a region where a luminance is lower in a luminance distribution generated by a plurality of point light sources when the plurality of recesses is formed all over a first surface.

In the light diffusion sheet of the present disclosure, the luminance enhancer that is flatter than the light diffuser is provided in the region where the luminance decreases in the luminance distribution when the recesses provided in the light diffuser is formed on the entire surface of the sheet. In a portion where the luminance enhancer is disposed, light diffusibility is suppressed, and as a result, a proportion of a linear light traveling straight perpendicularly to the sheet surface increases. Consequently, the luminance in the region where the luminance decreases can be increased, and luminance uniformity can be improved while the decrease in the luminance of the entire screen is avoided in the liquid crystal display device. Therefore, the light diffusion sheet of the present disclosure can further reduce the thickness of a backlight and the number of light sources.

In the light diffusion sheet of the present disclosure, the luminance enhancers are provided in a gradation pattern so that the arrangement density is higher in a region where the luminance is lower in the luminance distribution. It is therefore easy to adjust the area, density, and the like of a portion where the proportion of the linear light is increased in accordance with the luminance distribution, and thus, the luminance uniformity can be further improved.

In the light diffusion sheet of the present disclosure, the region where the luminance is lower may be a region between adjacent point light sources among the plurality of point light sources. In this way, the luminance in the region between the point light sources can be increased, and the luminance uniformity can be improved.

In the light diffusion sheet of the present disclosure, the region where the luminance is lower may be a region immediately above the plurality of point light sources. In this way, the luminance in the region immediately above the point light sources can be increased, and the luminance uniformity can be improved.

In the light diffusion sheet of the present disclosure, the plurality of recesses may be also formed in an arrangement region of the plurality of luminance enhancers, and the plurality of luminance enhancers may include transparent members provided in the plurality of recesses in the arrangement region. In this way, the luminance enhancer can be formed by providing the transparent member in the recess in a predetermined region after forming the recesses on the entire surface of the sheet. In this case, each of the transparent members constituting the plurality of luminance enhancers may fill at least one or more of the plurality of recesses in the arrangement region. As described above, the luminance enhancer can be more easily formed when one transparent member fills one or more recesses than when a plurality of transparent members is provided in one recess.

In the light diffusion sheet of the present disclosure, the plurality of recesses is not required to be formed in the arrangement region of the plurality of luminance enhancers, and the plurality of luminance enhancers may include the same material as the light diffuser. In this way, the luminance enhancer can be formed by processing using, for example, a mold, a shape roll, a laser, or the like without performing a step of providing the transparent member in the recess.

In the light diffusion sheet of the present disclosure, the plurality of recesses may have an inverted polygonal pyramid shape, an inverted polygonal frustum shape, or a lower hemispherical shape. In this way, the light diffusibility of the light diffuser can be improved.

A backlight unit of the present disclosure is incorporated in the liquid crystal display device and guides light emitted from the plurality of point light sources toward the display screen, and the light diffusion sheet of the present disclosure is provided between the display screen and the plurality of point light sources.

In the backlight unit of the present disclosure, since the light diffusion sheet of the present disclosure is provided, the luminance uniformity can be improved while a decrease in luminance of the entire screen is avoided.

In the backlight unit of the present disclosure, a distance between the plurality of point light sources and the light diffusion sheet may be 2 mm or less. In such a configuration in which variation in luminance distribution easily occurs in the conventional light diffusion sheet, the luminance uniformity can be also improved.

In the backlight unit of the present disclosure, the plurality of point light sources may be an LED element. In this way, the luminance of the entire screen can be sufficiently obtained even if the number of light sources is reduced.

In the backlight unit of the present disclosure, the plurality of point light sources may be disposed on a reflecting member provided on an opposite side of the display screen as viewed from the light diffusion sheet. In this way, the luminance uniformity is further improved.

A liquid crystal display device of the present disclosure includes the backlight unit of the present disclosure and a liquid crystal display panel.

In the liquid crystal display device of the present disclosure, since the backlight unit of the present disclosure is provided, the luminance uniformity can be improved while a decrease in luminance of the entire screen is avoided.

An information apparatus of the present disclosure includes the liquid crystal display device of the present disclosure described above.

In the information apparatus of the present disclosure, since the liquid crystal display device of the present disclosure is provided, the luminance uniformity can be improved while a decrease in luminance of the entire screen is avoided.

A method for manufacturing a light diffusion sheet of the present disclosure is a method for manufacturing a light diffusion sheet incorporated in a liquid crystal display device in which a plurality of point light sources is dispersedly provided on a back surface side of a display screen. At least a first surface of the light diffusion sheet has a light diffuser provided with a plurality of recesses provided two-dimensionally and a plurality of luminance enhancers that is flatter than the light diffuser. The method for manufacturing a light diffusion sheet of the present disclosure includes a step A of calculating the luminance distribution generated by the plurality of point light sources when the plurality of recesses is formed all over the first surface, a step B of forming the light diffuser on the first surface, and a step C of forming the luminance enhancer on the first surface in a gradation pattern so that the arrangement density is higher in a region where the luminance is lower in the luminance distribution calculated in the step A.

In the method for manufacturing a light diffusion sheet of the present disclosure, the luminance enhancer that is flatter than the light diffuser is provided in the region where the luminance decreases in the luminance distribution when the recesses provided in the light diffuser is formed on the entire surface of the sheet. In a portion where the luminance enhancer is disposed, light diffusibility is suppressed, and as a result, a proportion of a linear light traveling straight perpendicularly to the sheet surface increases. Consequently, the luminance in the region where the luminance decreases can be increased, and luminance uniformity can be improved while the decrease in the luminance of the entire screen is avoided in the liquid crystal display device. Therefore, it is possible to further reduce the thickness of the backlight and the number of light sources.

In the method for manufacturing a light diffusion sheet of the present disclosure, the luminance enhancers are provided in a gradation pattern so that the arrangement density is higher in a region where the luminance is lower in the luminance distribution. It is therefore easy to adjust the area, density, and the like of a portion where the proportion of the linear light is increased in accordance with the luminance distribution, and thus, the luminance uniformity can be further improved.

In the method for manufacturing a light diffusion sheet of the present disclosure, the step B may include a step of forming the plurality of recesses in an arrangement region of the plurality of luminance enhancers, and the step C may include a step of forming the plurality of luminance enhancers by providing a transparent member in the plurality of recesses in the arrangement region after the step B. In this way, the luminance enhancer can be formed by providing the transparent member in the recess in a predetermined region after forming the recesses on the entire surface of the sheet.

In the method for manufacturing a light diffusion sheet of the present disclosure, the step B and the step C may be performed simultaneously. The number of steps can be reduced by simultaneously performing the step B and the step C by processing using, for example, a mold, a shape roll, a laser, or the like.

The present disclosure can improve luminance uniformity while avoiding a decrease in luminance of an entire screen in the liquid crystal display device.

BRIEF DESCRIPTION OF THE DRAWINGS

FIG. 8 is a plan view illustrating an arrangement pattern of the luminance enhancers of the light diffusion sheet according to a modification.

FIG. 9 is a plan view illustrating an arrangement pattern of the luminance enhancers of the light diffusion sheet according to a modification.

FIG. 14 is a diagram illustrating luminance distribution of the light diffusion sheet according to the comparative example.

DETAILED DESCRIPTION

Hereinafter, a light diffusion sheet, a backlight unit, a liquid crystal display device, an information apparatus, and a method for manufacturing the light diffusion sheet according to an embodiment will be described with reference to the drawings. Note that the scope of the present disclosure is not limited to the following embodiment, and can be arbitrarily changed within the scope of the technical idea of the present disclosure.

<Configuration of Liquid Crystal Display Device>

Figure 1:
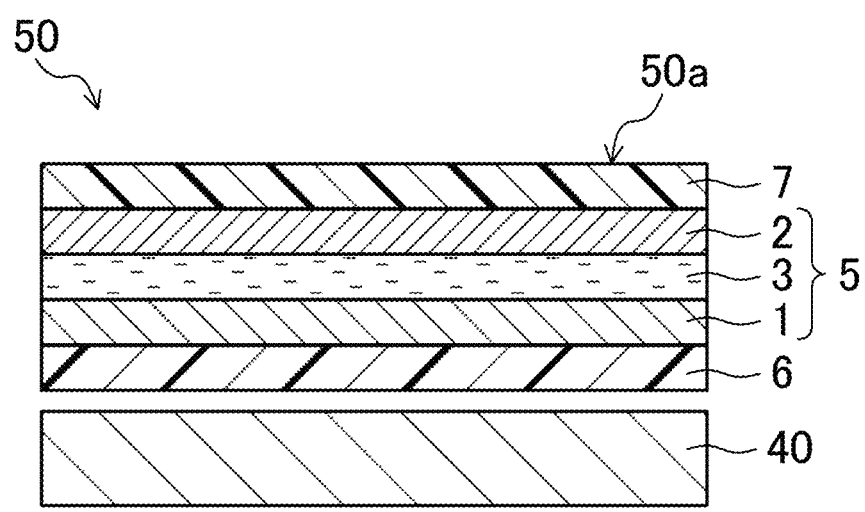
FIG. 1 is a sectional view of a liquid crystal display device according to an embodiment.

As illustrated in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 interposed therebetween.

The liquid crystal display panel 5 includes a TFT substrate 1 and a CF substrate 2 provided so as to face each other, a liquid crystal layer 3 provided between the TFT substrate 1 and the CF substrate 2, and a sealing material (not illustrated) provided in a frame shape for sealing the liquid crystal layer 3 between the TFT substrate 1 and the CF substrate 2.

In principle, the shape of a display screen 50a of the liquid crystal display device 50 as viewed from the front (upper side in FIG. 1) is a rectangle or a square, but is not limited thereto, and may be any shape such as a rectangle with rounded corners, an ellipse, a circle, a trapezoid, or an instrument panel of an automobile.

In the liquid crystal display device 50, in each subpixel corresponding to each pixel electrode, a voltage of a predetermined magnitude is applied to the liquid crystal layer 3 to change an alignment state of the liquid crystal layer 3. Thus, a transmittance of a light incident from the backlight unit 40 through the first polarizing plate 6 is adjusted. The light whose transmittance has been adjusted is emitted through the second polarizing plate 7, and an image is displayed on the display screen 50a.

The liquid crystal display device 50 according to the present embodiment is used as a display device incorporated in various information apparatuses (for example, an in-vehicle device such as a car navigation system, a personal computer, a mobile phone, a portable information terminal such as a laptop computer or a tablet, a portable game machine, a copier, a ticket machine, an automatic teller machine, or the like).

The TFT substrate 1 includes, for example, a plurality of TFTs provided in a matrix on a glass substrate, an interlayer insulating film provided so as to cover each of the plurality of TFTs, a plurality of pixel electrodes provided in a matrix on the interlayer insulating film and connected to each of the plurality of TFTs, and an alignment film provided so as to cover each of the plurality of pixel electrodes. The CF substrate 2 includes, for example, a black matrix provided in a lattice shape on a glass substrate, a color filter including a red layer, a green layer, and a blue layer provided between lattices of the black matrix, a common electrode provided to cover the black matrix and the color filter, and an alignment film provided to cover the common electrode. The liquid crystal layer 3 includes a nematic liquid crystal material or the like containing liquid crystal molecules having electro-optical characteristics. The first polarizing plate 6 and the second polarizing plate 7 include, for example, a polarizer layer having a polarization axis in one direction and a pair of protective layers provided so as to sandwich the polarizer layer.

<Configuration of Backlight Unit>

Figure 2:
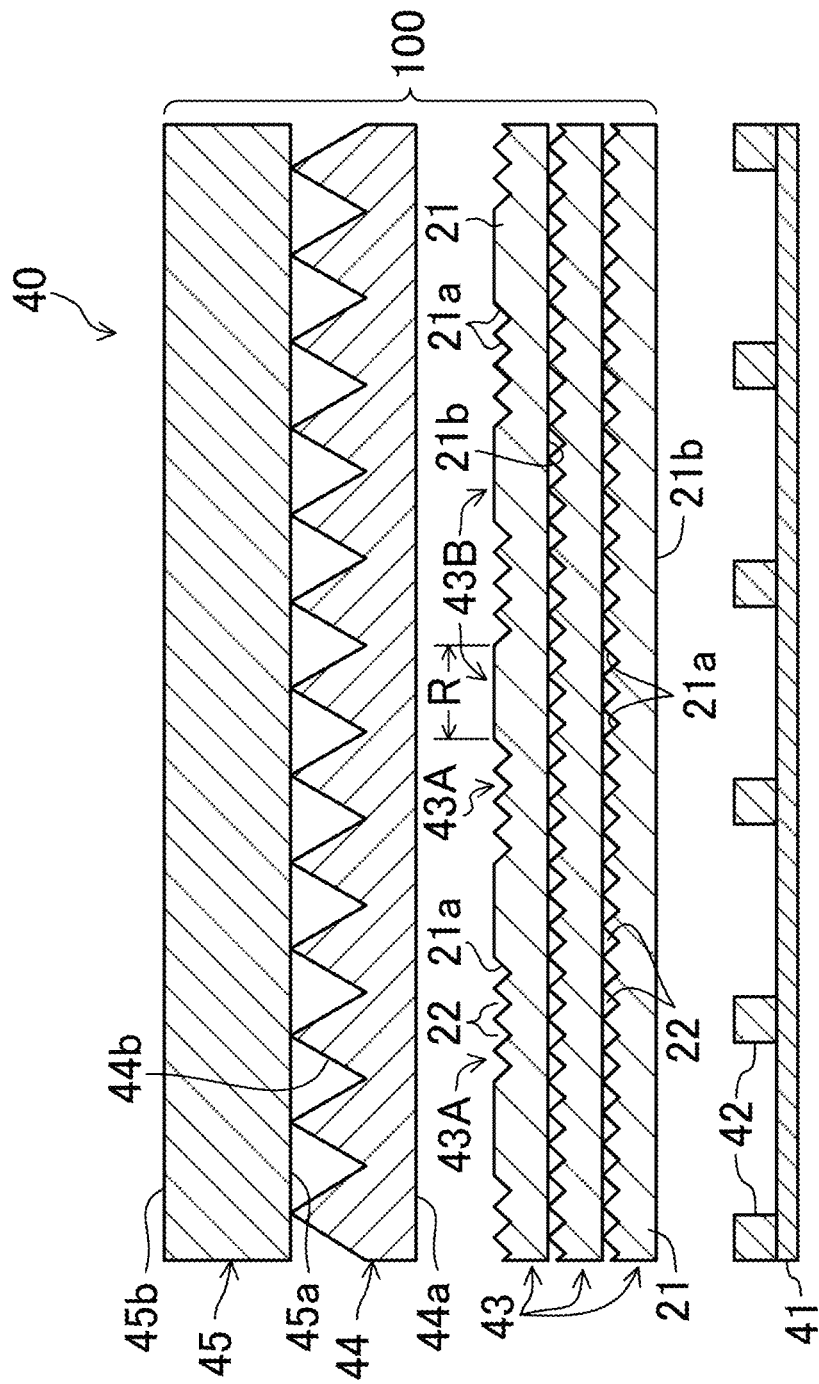
FIG. 2 is a sectional view of a backlight unit according to the embodiment.

As illustrated in FIG. 2, the backlight unit 40 includes a reflecting member 41, a plurality of point light sources 42 two-dimensionally arranged on the reflecting member 41, and a sheet laminate 100 provided above the plurality of point light sources 42. The sheet laminate 100 includes a light diffusion sheet 43 disposed on the side of the point light source 42, and a pair of prism sheets 44 and 45 provided above the light diffusion sheet 43 (on the side of the display screen 50a).

In the present embodiment, for example, three light diffusion sheets 43 are stacked and provided in the backlight unit 40. One light diffusion sheet 43 may be used or two light diffusion sheets 43 may be stacked, or four or more light diffusion sheets 43 may be stacked. In particular, when luminance uniformity can be sufficiently increased by precise arrangement of the point light sources 42 or the like, one light diffusion sheet 43 may be used. The pair of prism sheets 44 and 45 may be a lower prism sheet 44 and an upper prism sheet 45 whose prism stretching directions (extending directions of prism ridgelines) are orthogonal to each other.

—Reflecting Member—

The reflecting member 41 includes, for example, a white polyethylene terephthalate resin film, a silver deposited film, or the like.

—Point Light Source—

The type of the point light source 42 is not limited, but may be, for example, an LED element, a laser element, or the like, and an LED element may be used in terms of cost, productivity, and the like. In order to adjust a light emission angle characteristic of the LED element, a lens may be mounted on the LED element. The LED element (chip) may have a rectangular shape in planar view, and in this case, the length of one side may be 10 m or more (preferably 50 m or more) and 20 mm or less (preferably 10 mm or less, more preferably 5 mm or less). The LED chips of several mm square may be arranged on the reflecting member 41 two-dimensionally alternately at regular intervals. When the plurality of LED chips is arranged at equal intervals, a center-to-center distance between two adjacent chips may be 0.5 mm or more (preferably 2 mm or more) and 20 mm or less. By regularly arranging the point light sources 42 such as an LED element, the luminance uniformity is improved.

The point light sources 42 may be arranged on the reflecting member 41 having a sheet shape. Alternatively, the point light source 42 may be embedded in the reflecting member 41 such that only a light emitter (for example, a lens attached to the LED element) of the point light source 42 is exposed.

The point light source 42 may be a white light source. The white light source may include an LED element having a peak wavelength in a blue region, an LED element having a peak wavelength in a green region, and an LED element having a peak wavelength in a red region. Alternatively, the point light source 42 may be a blue light source. When a blue light source is used, a color conversion sheet may be provided between the point light sources 42 and the light diffusion sheet 43 or between the light diffusion sheet 43 and the lower prism sheet 44 in order to convert blue light into light of an arbitrary color (for example, green or red). As the color conversion sheet, for example, a quantum dot (QD) sheet, a fluorescent sheet, or the like may be used.

—Light Diffusion Sheet—

The light diffusion sheet 43 includes a base material layer 21. The light diffusion sheet 43 (base material layer 21) has a first surface 21a to be a light emission surface and a second surface 21b to be a light incident surface. That is, the light diffusion sheet 43 is disposed with the second surface 21b facing the point light sources 42. The resin to be a matrix of the base material layer 21 is not limited as long as including a material that transmits light, and may be, for example, acrylic, polystyrene, polycarbonate, methyl methacrylate-styrene copolymer (MS) resin, polyethylene terephthalate, polyethylene naphthalate, cellulose acetate, polyimide, or the like. The base material layer 21 may include a diffusing agent and other additives, or is not required to substantially include an additive. The additive that can be included in the base material layer 21 is not limited, but may be, for example, inorganic particles such as silica, titanium oxide, aluminum hydroxide, and barium sulfate, or organic particles such as acrylic, acrylonitrile, silicone, polystyrene, and polyamide.

A thickness of the light diffusion sheet 43 is not limited, but may be, for example, 3 mm or less (preferably 2 mm or less, more preferably 1.5 mm or less, and still more preferably 1 mm or less) and 0.1 mm or more. When the thickness of the light diffusion sheet 43 exceeds 3 mm, it is difficult to reduce the thickness of the liquid crystal display device 50. When the thickness of the light diffusion sheet 43 is less than 0.1 mm, it is difficult to make the luminance uniform. The light diffusion sheet 43 may have a film shape or a plate shape.

Figure 3:
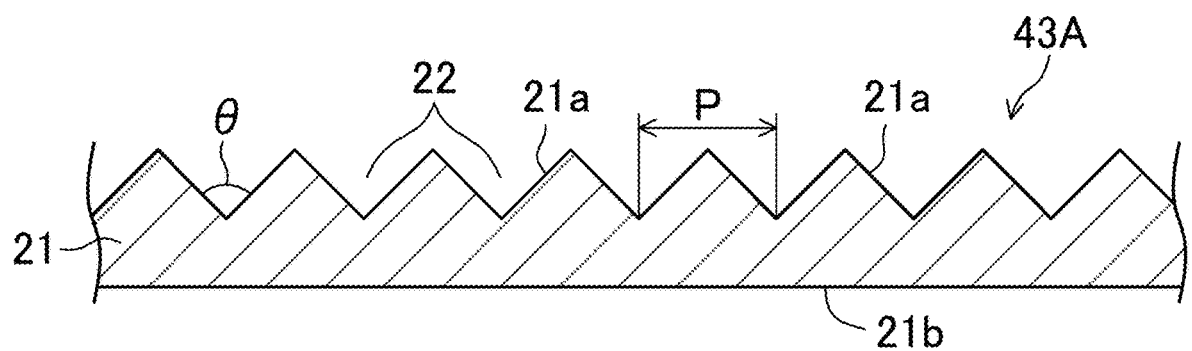
FIG. 3 is a sectional view of a light diffuser of a light diffusion sheet according to the embodiment.
Figure 4:
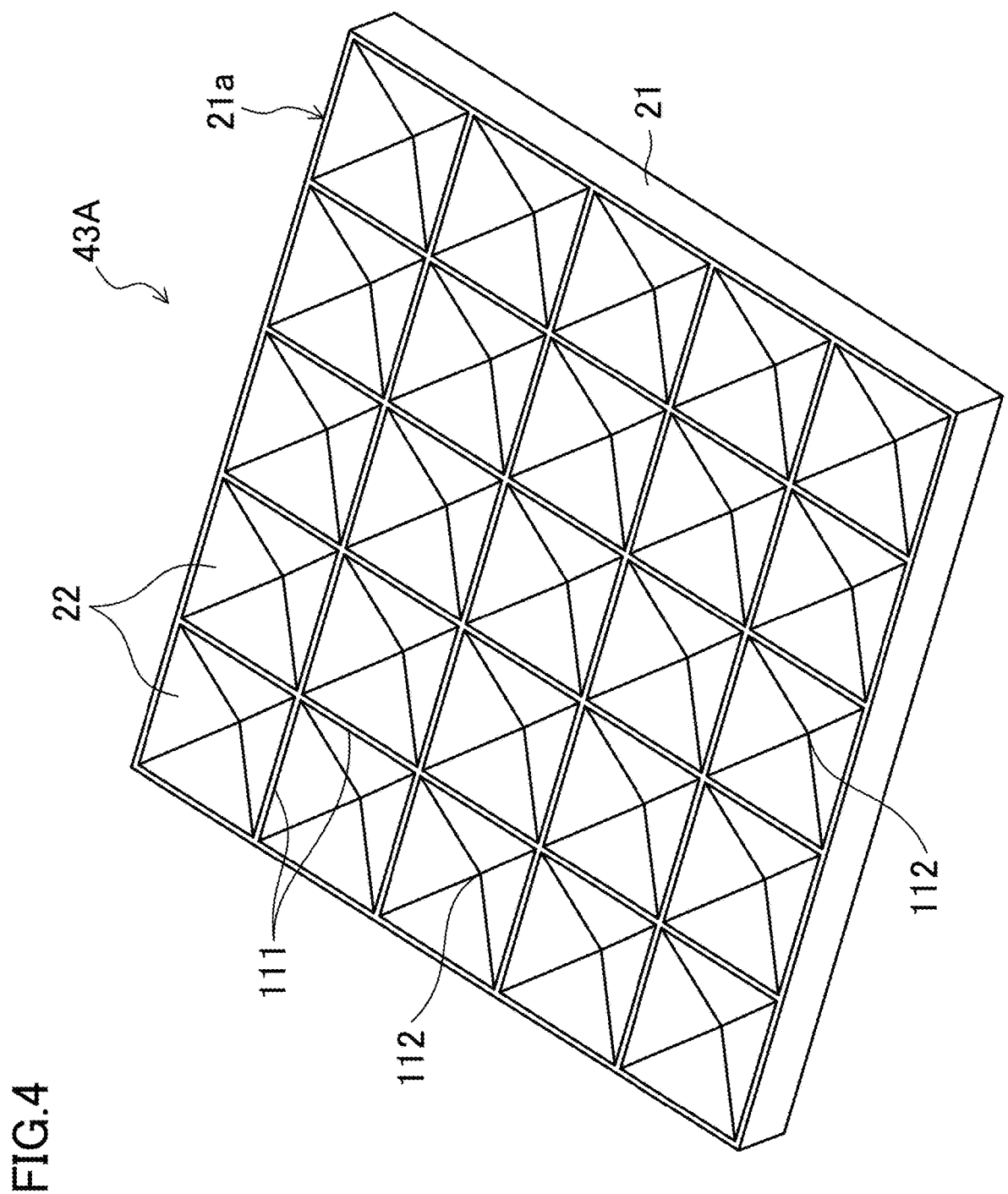
FIG. 4 is a perspective view of a light diffuser of the light diffusion sheet according to the embodiment.

As illustrated in FIGS. 2 to 4, on the first surface 21a of the light diffusion sheet 43, for example, a plurality of recesses 22 having an inverted quadrangular pyramid shape (inverted pyramid shape) are arrayed in a two-dimensional matrix. A portion of the light diffusion sheet 43 where the recesses 22 are provided is a light diffuser 43A. The plurality of recesses 22 may be arrayed along two directions orthogonal to each other. Adjacent recesses 22 are defined by a ridgeline 111. The ridgelines 111 extend along two directions in which the recesses 22 are arrayed. A center (vertex of the inverse pyramid) 112 of the recess 22 is the deepest portion of the recess 22. FIG. 4 exemplifies, for simplicity, a state in which the recesses 22 are arranged in a matrix of 5×5 in the light diffuser 43A. In the two-dimensional array of the recesses 22, the recesses 22 may be provided without gaps or may be provided at predetermined intervals. Some of the recesses 22 may be randomly arrayed to such an extent that a light diffusion effect is not impaired.

An apex angle $\theta$ of the recess 22 may be, for example, 90°, an array pitch p of the recesses 22 may be, for example, 100 μm, and a depth of the recess 22 may be, for example, 50 μm. The apex angle $\theta$ of the recess 22 is an angle formed by cross-sectional lines of a pair of inclined surfaces of the recess 22, where the cross-sectional lines appear in a cross section (longitudinal cross-section) when the recess 22 is cut by a plane perpendicular to an arrangement surface of the light diffusion sheet 43, such that the plane passes through the center of the recess 22 (apex 112 of the inverted pyramid) and vertically traverses the pair of inclined surfaces of the recess 22. The array pitch p of the recesses 22 is a distance (distance along a direction parallel to the arrangement surface of the light diffusion sheet 43) between the centers (vertexes 112 of the inverse pyramids) of the adjacent recesses 22.

In the present disclosure, in consideration of the fact that it is difficult to form a geometrically strict recess of an inverted quadrangular pyramid by a normal shape transfer technique, the "inverted quadrangular pyramid" includes not only a shape that can be regarded as authentically or substantially inverted quadrangular pyramid but also a "substantially inverted quadrangular pyramid". "Substantially" means that the shape can be approximated, and "substantially inverted quadrangular pyramid" means a shape that can be approximated to an inverted quadrangular pyramid. A shape deformed from an "inverted quadrangular pyramid" within a range of unavoidable shape variation caused by processing accuracy in industrial production is also included in the "substantially inverted quadrangular pyramid". In the present embodiment, the recess 22 having an inverted quadrangular pyramid shape is formed, but instead, the same applies to a case where the recess 22 having other shapes such as an inverted polygonal pyramid other than an inverted quadrangular pyramid, an inverted truncated polygonal pyramid including an inverted truncated quadrangular pyramid, an inverted cone, an inverted circular truncated cone, and a lower hemisphere is formed.

The second surface 21b of the light diffusion sheet 43 may be, for example, a flat surface (mirror surface) or an embossed surface. Alternatively, the second surface 21b of the light diffusion sheet 43 may also be provided with an uneven shape in the same manner as the first surface 21a. The light diffusion sheet 43 may have a one-layer structure of the base material layer 21 having an uneven shape (the recess 22) on the first surface 21a. The light diffusion sheet 43 may have a two-layer structure of a base material layer having flat surfaces and a layer having an uneven shape on one surface. The light diffusion sheet 43 may have a structure of three or more layers including a layer having an uneven shape on one surface. In the present embodiment, the first surface 21a of the light diffusion sheet 43 is the light emission surface, and the second surface 21b is the light incident surface. Instead, the first surface 21a may be the light incident surface, and the second surface 21b may be the light emission surface.

Figure 5:
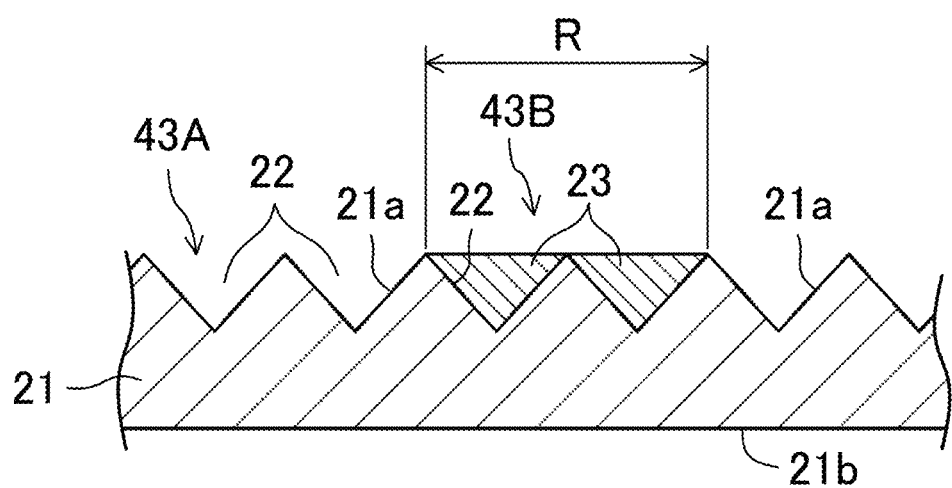
FIG. 5 is a sectional view of a luminance enhancer of the light diffusion sheet according to the embodiment.

As a characteristic of the present embodiment, as illustrated in FIGS. 2 and 5, the first surface 21a of the light diffusion sheet 43 includes a plurality of luminance enhancers 43B that is flatter than the light diffusers 43A, in addition to the light diffusers 43A provided with the plurality of recesses 22. When a plurality of the light diffusion sheets 43 is stacked, the luminance enhancer 43B may be provided on at least one light diffusion sheet 43, for example, the light diffusion sheet 43 closest to the display screen 50a. The luminance enhancer 43B is provided in a low luminance region R of a luminance distribution generated by the point light source 42 when the recesses 22 are formed all over the first surface 21a of the light diffusion sheet 43. The low luminance region R may be, for example, a region (inter-light source region) between the adjacent point light sources 42. As illustrated in FIG. 5, for example, the luminance enhancer 43B may include a transparent member 23 provided in the recess 22 in the low luminance region R. Details of the luminance enhancer 43B will be described later.

—Prism Sheet—

The prism sheets 44 and 45, required to transmit light beams, include a transparent (for example, colorless and transparent) synthetic resin as a main component. The prism sheets 44 and 45 may be integrally formed. The lower prism sheet 44 has a base material layer 44a and a protrusion row including a plurality of protruding prisms 44b stacked on the surface of the base material layer 44a. Similarly, the upper prism sheet 45 has a base material layer 45a and a protrusion row including a plurality of protruding prisms 45b stacked on the surface of the base material layer 45a. The protruding prisms 44b and 45b are stacked in a stripe shape on the surfaces of the base material layers 44a and 45a, respectively. The protruding prisms 44b and 45b are triangular columnar bodies whose back surfaces are in contact with the surfaces of the base material layers 44a and 45a, respectively. The extending direction of the protruding prism 44b and the extending direction of the protruding prism 45b are orthogonal to each other. As a result, alight beam incident from the light diffusion sheet 43 can be refracted toward a normal direction by the lower prism sheet 44, and a light beam emitted from the lower prism sheet 44 can be refracted so as to travel substantially perpendicularly to the display screen 50a by the upper prism sheet 45.

A lower limit of a thickness of the prism sheets 44 and 45 (a height from the back surfaces of the base material layers 44a and 45a to vertexes of the protruding prisms 44b and 45b) may be, for example, about 50 μm, and preferably about 100 μm. An upper limit of the thickness of the prism sheets 44 and 45 may be about 200 μm, preferably about 180 μm. A lower limit of a pitch of the protruding prisms 44b and 45b on the prism sheets 44 and 45 may be, for example, about 20 μm, preferably about 25 μm. An upper limit of the pitch of the protruding prisms 44b and 45b on the prism sheets 44 and 45 may be, for example, about 100 μm, preferably about 60 μm. Apex angles of the protruding prisms 44b and 45b may be, for example, 85° or more and 95° or less. A lower limit of a refractive index of the protruding prisms 44b and 45b may be, for example, 1.5, and preferably 1.55. An upper limit of the refractive index of the protruding prisms 44b and 45b may be, for example, 1.7.

In the prism sheets 44 and 45, for example, protruding prisms 44b and 45b subjected to shape transfer using a UV curable acrylic resin may be provided on the base material layers 44a and 45a including a polyethylene terephthalate (PET) film, or the protruding prisms 44b and 45b may be integrally molded with the base material layers 44a and 45a.

—Polarizing Sheet—

Although not illustrated, a polarizing sheet may be provided above the prism sheets 44 and 45 (on the side of the display screen 50a). The polarizing sheet enhances the luminance of the display screen 50a by preventing a light emitted from the backlight unit 40 from being absorbed by the first polarizing plate 6 of the liquid crystal display device 50.

<Luminance Enhancer>

In the backlight unit 40 illustrated in FIG. 2, a light emitted from the point light source 42 is diffused by the recess 22 and a diffusing agent (not illustrated) when passing through the light diffusion sheet 43. As a result, for example, the luminance in a region immediately above the point light source 42 is suppressed. However, if the backlight unit 40 is thinned by reducing a distance between the point light source 42 and the light diffusion sheet 43 or a thickness of the light diffusion sheet 43, or if the number of point light sources 42 is reduced in order to reduce the cost, the luminance decreases in the low luminance region R such as the inter-light source region (region where no light source is disposed), for example.

Therefore, in the present embodiment, the luminance enhancer 43B that is flatter than the light diffuser 43A is provided with the recess 22 is provided in the inter-light source region R on the first surface 21a of the uppermost light diffusion sheet 43. An arithmetic average roughness Ra and maximum heights Rz and Ry (JIS B0606-1994) of the luminance enhancer 43B are smaller than those of the light diffuser 43A. The surface of the luminance enhancer 43B may be smooth, or may have unevenness in a range in which light diffusibility is lower than light diffusibility of the light diffuser 43A.

In a portion where the luminance enhancer 43B is disposed, the light diffusibility is suppressed, and as a result, a proportion of a linear light traveling straight perpendicularly to the sheet surface increases. Thus, the luminance in the low luminance region R can be increased. As illustrated in FIG. 5, for example, the luminance enhancer 43B may include a transparent member 23 provided in the recess 22 in the low luminance region R. In this case, each of the transparent members 23 constituting the luminance enhancers 43B may fill at least one or more recesses 22. As described above, the luminance enhancer 43B can be more easily formed when one transparent member 23 fills one or more recesses 22 than when a plurality of transparent members 23 is provided in one recess 22. The transparent member 23 may be a dot printable transparent ink. In this way, the luminance enhancer 43B can be formed by a simple method of printing the transparent ink. When the luminance enhancer 43B includes the transparent member 23, a difference in refractive index between the base material layer 21 of the light diffusion sheet 43 and the transparent member 23 is preferably as small as possible, but may be about 0.3 or less. In this way, the luminance of the low luminance region R can be increased without being affected by light diffusion at an interface between the base material layer 21 and the transparent member 23.

When a matrix resin of the base material layer 21 is, for example, poly carbonate, for example, medium may be used as the transparent member 23 (transparent ink) to be the luminance enhancer 43B. The medium may be, for example, either a UV curing type or a thermal curing type. As the transparent member 23, for example, a UV curable resin such as urethane acrylate or acrylic resin may be used. As the acrylic resin, an ultraviolet curable polyester acrylate, an ultraviolet curable epoxy acrylate, an ultraviolet curable polyol acrylate, or the like may be used. Alternatively, as the transparent member 23, a thermosetting resin such as a phenol resin, a urea resin, a melamine resin, an unsaturated polyester resin, a diallyl phthalate resin, an epoxy resin, a silicon resin, an alkyd resin, polyimide, polyaminobismaleimide, a casein resin, a furan resin, or a urethane resin, for example, may be used.

When the luminance enhancer 43B is formed by dot printing with a transparent ink, a total light transmittance, that is, the luminance increases as an area ratio of the dot printing increases. Therefore, by adjusting the area ratio of the dot printing, the total light transmittance according to a degree of luminance reduction in the low luminance region R can be easily achieved. In other words, the low luminance region R and the degree of luminance reduction in the low luminance region R are confirmed, and dot printing of the transparent ink is performed on the low luminance region R of the light diffusion sheet 43 at an area ratio corresponding to the degree of luminance reduction to form the luminance enhancer 43B. Thus, the luminance uniformity can be improved.

When a transparent ink is used as the transparent member 23, chromaticity and the like may be adjusted by adding a color ink (for example, white, yellow, or blue color ink) to the transparent ink in a concentration range in which transparency necessary for enhancing the luminance can be maintained. In addition, particles such as a diffusing agent may be added to the transparent ink to adjust diffusibility, refractive index, and the like.

The transparent member 23 is not limited to the transparent ink, and other materials having high transparency capable of increasing the luminance by filling the recess 22, for example, a material obtained by dispersing a white pigment including an inorganic substance such as alumina, titanium oxide, barium sulfate, zinc oxide, or calcium carbonate, a urea-based organic substance, or the like in a vehicle (varnish obtained by dissolving a resin in a solvent) can also be used.

In the light diffusion sheet 43 illustrated in FIG. 5, the luminance enhancer 43B (transparent member 23) is provided such that the recess 22 in the low luminance region R is completely filled, but the luminance enhancer 43B may be provided such that the recess 22 is at least partially filled. The luminance enhancer 43B may be provided in all the low luminance regions R, or may be provided in some of the low luminance regions R. The luminance enhancer 43B may be provided all over each low luminance region R or in a part of each inter-light source region R.

In the backlight unit 40 illustrated in FIG. 2, a case is exemplified where the low luminance region R is an inter-light source region between the adjacent point light sources 42. In this case, the luminance uniformity can be improved by providing the luminance enhancer 43B in the inter-light source region to be the low luminance region R. The inter-light source region includes not only a region between the point light sources 42 adjacent to each other along two directions in which the point light sources 42 are arrayed, but also a region between the point light sources 42 adjacent to each other along a direction (diagonal direction) inclined with respect to an array direction of the point light sources 42. When a center-to-center distance of the point light sources 42 such as an LED element is 0.5 mm or more, a phenomenon in which the luminance decreases in the inter-light source region easily occurs, and thus, usefulness of providing the luminance enhancer 43B increases.

Depending on the configuration of the backlight unit 40 (sheet laminate 100) and the structure of the light diffusion sheet 43, a region other than the inter-light source region is the low luminance region R in some cases.

In the backlight unit 40, usually, the luminance of a sheet end region tends to be relatively decreased. For example, when the luminance decreases in a peripheral edge of the rectangular display screen 50a, the luminance enhancer 43B may be disposed along a peripheral edge of the light diffusion sheet 43 corresponding to the shape of the display screen 50a. Alternatively, when the point light source 42 cannot be disposed at a corner of the track-shaped display screen 50a and the luminance decreases, the luminance enhancer 43B may be disposed at the corner of the light diffusion sheet 43.

Alternatively, due to an uneven structure formed on the second surface 21B (light incident surface) when the first surface 21a of the light diffusion sheet 43 is the light emission surface, or the light diffusibility of the light diffusion sheet 43 on the side of the point light source 42 (lower layer) when the plurality of light diffusion sheets 43 is stacked, the region immediately above the point light source 42 (hereinafter, the region is also referred to as a region immediately above the light source) in the light diffusion sheet 43 may become the low luminance region R. In this case, the luminance uniformity can be improved by providing the luminance enhancer 43B in the region immediately above the light source to be the low luminance region R. The region immediately above the light source may be a region including not only a projection region of the point light source 42 in the light diffusion sheet 43 but also a vicinity and a periphery of the projection region.

As described above, the low luminance region R is appropriately set in accordance with the luminance distribution (hereinafter, simply referred to as "luminance distribution") generated by the point light source 42 when the recesses 22 are formed all over the first surface 21a.

As one of the characteristics of the light diffusion sheet 43 according to the present embodiment, the luminance enhancers 43B are provided in a gradation pattern so that an arrangement density is higher in a region where the luminance is lower in the luminance distribution.

Figure 6:
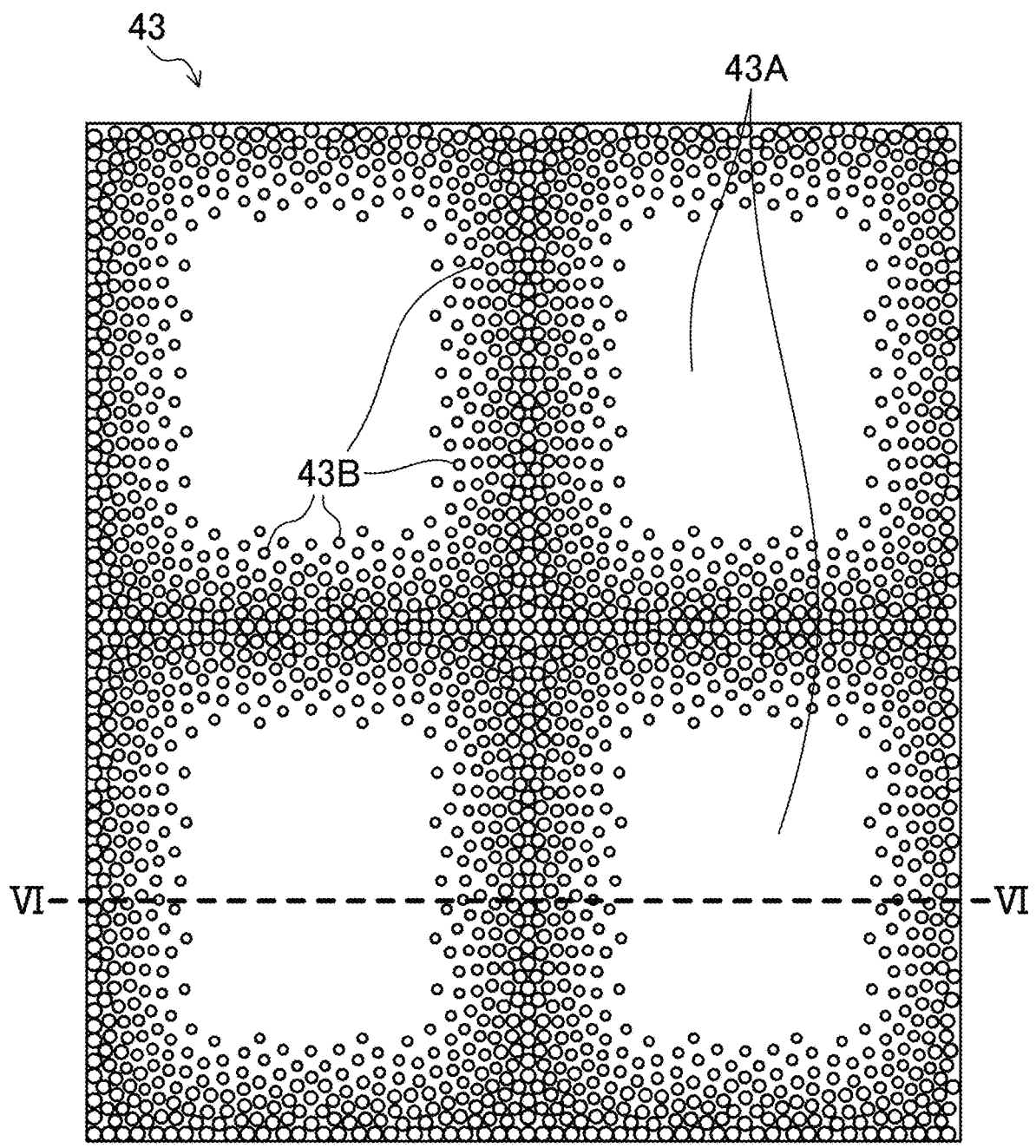
FIG. 6 is a plan view illustrating an arrangement pattern of the luminance enhancers of the light diffusion sheet according to the embodiment.

FIG. 6 illustrates an example of an arrangement pattern of the luminance enhancers 43B in the light diffusion sheet 43 according to the present embodiment. Specifically, FIG. 6 illustrates the arrangement pattern of the luminance enhancers 43B when unit light source regions each including four point light sources 42 including an LED element are provided in 2×2. In the light diffusion sheet 43 illustrated in FIG. 6, the luminance decreases toward a boundary of the unit light source regions. Therefore, the dot-shaped luminance enhancers 43B are provided in a gradation pattern so that the arrangement density is higher in a region where the luminance is lower in the luminance distribution. The dot-shaped luminance enhancers 43B are formed by, for example, dot printing with a transparent ink. As illustrated in FIG. 6, only the light diffuser 43A is disposed at a center of each unit light source region, and the arrangement density of the luminance enhancers 43B increases as approaching the boundary of each unit light source region. As described above, by providing the luminance enhancers 43B in a gradation pattern, it is easy to adjust the area, density, and the like of a portion where the proportion of the linear light is increased in accordance with the luminance distribution, and thus, the luminance uniformity can be further improved. The luminance enhancer 43B disposed near the boundary of each unit light source region (place having the lowest luminance) may have a line shape or a solid state. In other words, the dot-shaped luminance enhancer 43B and the line-shaped or solid luminance enhancer 43B may be mixed.

In the present disclosure, a shape recognized as a granular shape of a circle, a triangle, a square, or the like is referred to as a "dot shape", a shape that can be recognized as a linear shape or a wavy line shape is referred to as a "line shape", and a shape having a surface (two-dimensional spread) in a shape other than the "dot shape" and the "line shape" is referred to as a "solid (meaning solid of solid printing) shape".

Figure 7:
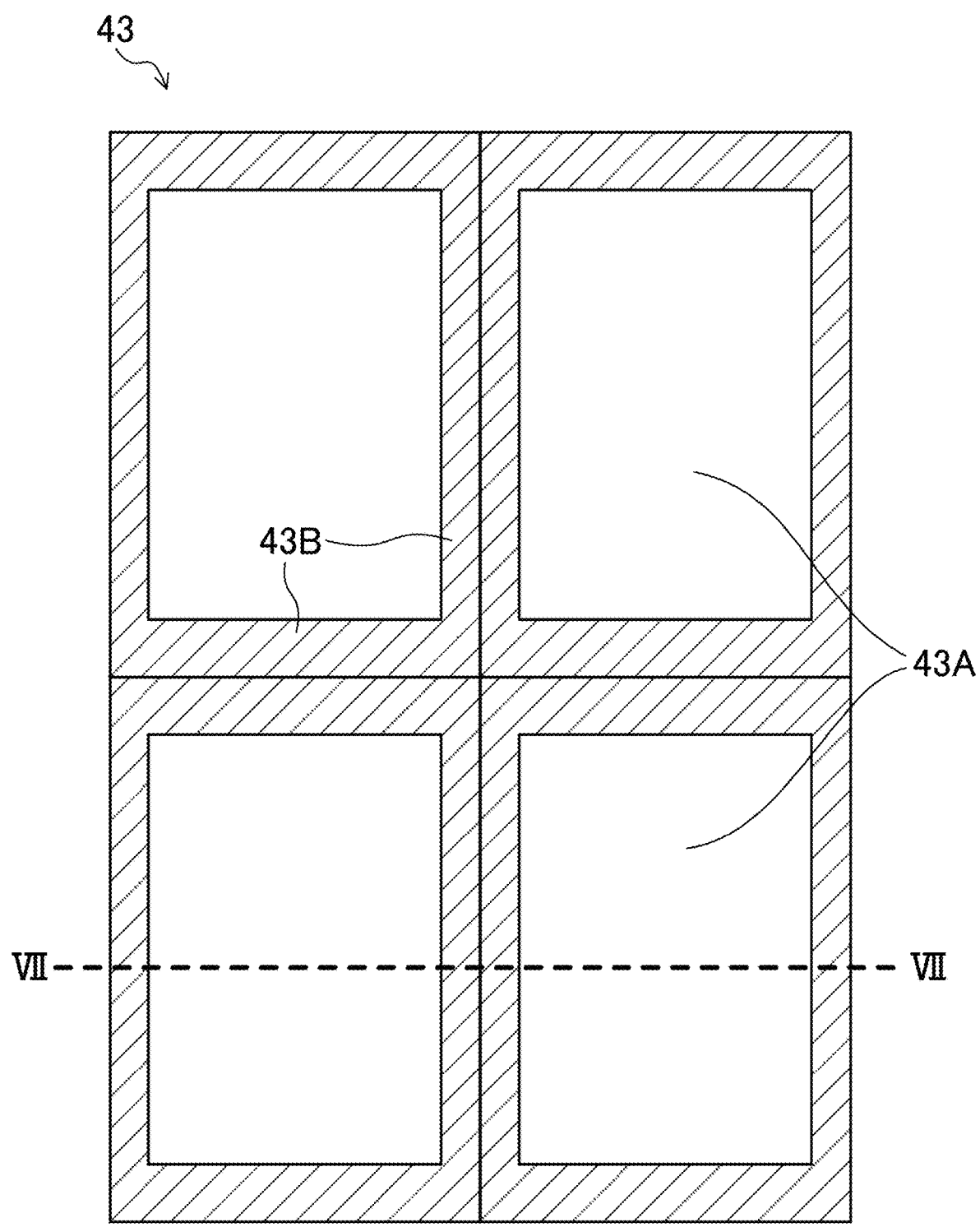
FIG. 7 is a plan view illustrating an arrangement pattern of the luminance enhancers of the light diffusion sheet according to a comparative example.

FIG. 7 illustrates an example of an arrangement pattern of the luminance enhancers 43B in the light diffusion sheet 43 according to a comparative example. The comparative example illustrated in FIG. 7 is different from the embodiment illustrated in FIG. 6 in that the solid luminance enhancer 43B is provided in the low luminance region R around the boundary of the unit light source region. The solid luminance enhancer 43B is formed by solid printing with a transparent ink. When the luminance enhancer 43B is provided in a solid state as in the comparative example, it is difficult to adjust the area, density, and the like of the portion where the proportion of the linear light is increased in accordance with the luminance distribution, and thus the luminance uniformity is deteriorated as compared with the embodiment.

In the light diffusion sheet 43 according to the present embodiment, the arrangement pattern of the luminance enhancers 43B is not limited as long as the luminance enhancers 43B are provided in a gradation pattern such that the arrangement density is higher in a region where the luminance is lower in the luminance distribution.

For example, as illustrated in FIG. 8, the luminance enhancer 43B may be provided in a line shape such as a linear shape or a wavy line shape. A width, length, line interval, and the like of the lines are appropriately set, for example, by adjusting the print density of the transparent ink in accordance with the luminance distribution, and a plurality of lines having different dimensions may be used. The line-shaped luminance enhancer 43B and the dot-shaped or solid luminance enhancer 43B may be mixed. Note that FIGS. 8(a) and 8(b) exemplify a case where the inter-light source region between the adjacent point light sources 42 is the low luminance region R. That is, in the inter-light source region, the arrangement density of the luminance enhancers 43B is high, and the arrangement density of the luminance enhancers 43B decreases as approaching the region immediately above the light source.

The arrangement pattern illustrated in (b) of FIG. 9 in which the arrangement pattern of the light diffusers 43A and the arrangement pattern of the luminance enhancers 43B are inverted from the arrangement pattern illustrated in (a) of FIG. 9 in which the luminance enhancer 43B is provided in a dot shape may be used. The shape of the dot is not limited to a circle, and may be a triangle, a quadrangle, a hexagon, or other shapes, or the dot may have a plurality of different shapes. A size and interval of the dots are appropriately set, for example, by adjusting the print density of the transparent ink in accordance with the luminance distribution, and a plurality of dots having different sizes may be used. The luminance enhancer 43B having a dot shape or its inverted shape and the luminance enhancer 43B having a line shape or a solid state may be mixed. Note that FIGS. 9(a) and 9(b) exemplify a case where the inter-light source region between the adjacent point light sources 42 is the low luminance region R. That is, in the inter-light source region, the arrangement density of the luminance enhancers 43B is high, and the arrangement density of the luminance enhancers 43B decreases as approaching the region immediately above the light source.

Figure 10:
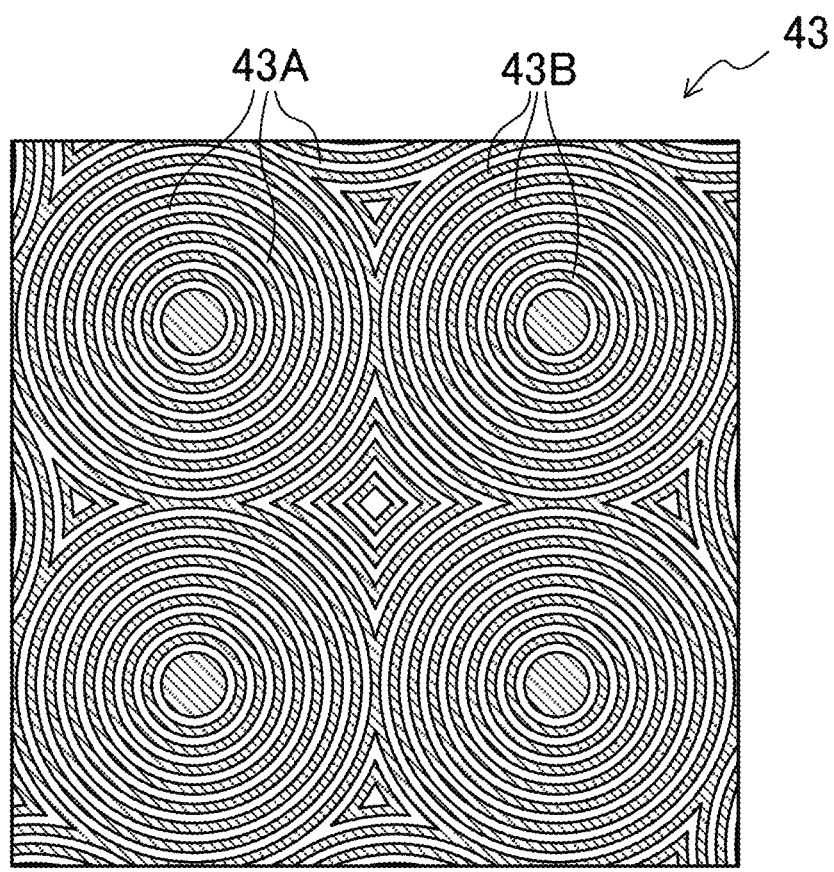
FIG. 10 is a plan view illustrating an arrangement pattern of the luminance enhancers of the light diffusion sheet according to a modification.

Instead of arranging the luminance enhancers 43B in a radial pattern as illustrated in FIGS. 8 and 9, the luminance enhancers 43B may be arranged in another geometric pattern such as a ripple pattern illustrated in FIG. 10.

In the light diffusion sheet 43 according to the present embodiment, a case is exemplified where the recess 22 is also formed in an arrangement region (low luminance region R) of the luminance enhancer 43B, and the luminance enhancer 43B includes the transparent member 23 provided in the recess 22. Instead, the recess 22 is not required to be formed in the arrangement region (low luminance region R) of the luminance enhancer 43B, and the luminance enhancer 43B may include the same material as the light diffuser 43A (for example, the base material layer 21). In this way, the luminance enhancer 43B can be formed by processing the base material layer 21 by using, for example, a mold, a shape roll, a laser, or the like without performing a step of providing the transparent member 23 in the recess 22. In other words, instead of using printing of the transparent ink, the recess 22 and a flat portion to be the luminance enhancer 43B can be provided as the shape itself of the light diffusion sheet 43 (base material layer 21) by using a mold, a shape roll, a laser, or the like.

<Method for Manufacturing Light Diffusion Sheet>

In a method for manufacturing the light diffusion sheet 43 according to the present embodiment, a step A of calculating a luminance distribution generated by the point light source 42 when the recess 22 provided in the light diffuser 43A is formed all over the first surface 21a, a step B of forming the light diffuser 43A on the first surface 21a, and a step C of forming the luminance enhancer 43B on the first surface 21a in a gradation pattern so that the arrangement density is higher in a region where the luminance is lower in the luminance distribution calculated in the step A are performed.

The step B may include a step of forming the recess 22 in the arrangement region (low luminance region R) of the luminance enhancer 43B, and the step C may include a step of forming the luminance enhancer 43B by providing the transparent member 23 in the recess 22 in the low luminance region R after the step B. In this way, the luminance enhancer 43B can be formed by providing the transparent member 23 in the recess 22 in a predetermined region after forming the recesses 22 on the entire surface of the sheet. In this case, for example, when a transparent ink such as medium is used as the transparent member 23, the luminance enhancer 43B can be formed by a simple method of printing the transparent ink. When dot printing with a transparent ink is used, adjustment of the total light transmittance becomes easy. However, a method of forming the luminance enhancer 43B is not limited to dot printing, and other known pattern forming methods and the like may be used.

When the transparent member 23 is provided in the recess 22 by using screen printing of a transparent ink, for example, a patterning plate having an opening in the low luminance region R may be placed on the ridgeline 111 illustrated in FIG. 4, and the transparent ink may be dropped on the patterning plate to smooth the transparent ink with a squeeze. As a result, the recess 22 in the low luminance region R is filled with the transparent member 23 up to a height of the ridgeline 111, and the luminance enhancer 43B having a flat surface is formed.

When the transparent ink is printed in step C of forming the luminance enhancer 43B, the step C is separately performed after the step B. In this case, the step A of calculating the luminance distribution may be performed between the step B and the step C. That is, after the recess 22 is formed on the entire first surface 21a of the light diffusion sheet 43 in the step B, the luminance distribution may be calculated in the step A by using the light diffusion sheet 43 in which the recess 22 is formed. Alternatively, before the step B is performed, the luminance distribution may be calculated in the step A by using a dummy light diffusion sheet or simulation.

On the other hand, in a case of performing processing using, for example, a mold, a shape roll, a laser, or the like without performing the printing of the transparent ink in the step C of forming the luminance enhancer 43B, the step B and the step C can be simultaneously performed, and thus the number of steps can be reduced. In the case of forming the luminance enhancer 43B in the step C by using the shape roll, the step C is always performed simultaneously with the step B of forming the light diffuser 43A. When the luminance enhancer 43B is formed in the step C by using a mold or a laser, the step C may be performed simultaneously with the step B of forming the light diffuser 43A, or the step C may be performed separately from the step B. When the step B and the step C are simultaneously performed, the luminance distribution may be calculated in the step A by using a dummy light diffusion sheet or simulation before the step B and the step C are performed.

A method for imparting the shape of the recess 22 and the like in the light diffusion sheet 43 is not limited, but for example, an extrusion molding method, an injection molding method, a laser processing method, or the like may be used.

A procedure for producing a single-layer light diffusion sheet having an uneven shape on the surface by the extrusion molding method is as follows. First, pellet-shaped plastic particles to which a diffusing agent is added (pellet-shaped plastic particles to which a diffusing agent is not added may be additionally mixed) are charged into a single-screw extruder, and melted and kneaded while being heated. Thereafter, the molten resin extruded by a T die is sandwiched between two metal rolls and cooled, then conveyed by a guide roll, and cut into a sheet-like flat plate by a sheet cutter machine to prepare a light diffusion sheet. Here, since an inverted shape of a roll surface is transferred to the resin by sandwiching the molten resin by the metal roll having the shape obtained by inverting a desired uneven shape on the surface, the desired uneven shape can be formed on the surface of the light diffusion sheet. Since the shape of the roll surface is not necessarily transferred by 100% to the shape transferred to the resin, the shape of the roll surface may be designed by calculating backward from a degree of transfer.

In a case of producing a light diffusion sheet having a two-layer structure having an uneven shape on the surface by the extrusion molding method, for example, pellet-shaped plastic particles necessary for forming each layer are charged into each of two single-screw extruders, and then the same procedure as described above may be performed for each layer to stack each produced sheet.

Alternatively, a light diffusion sheet having a two-layer structure having an uneven shape on the surface may be prepared as follows. First, pellet-shaped plastic particles necessary for forming each layer are charged into each of the two single-screw extruders, and melted and kneaded while being heated. Thereafter, the molten resin to be each layer is charged into one T die, stacked in the T die, and the stacked molten resin extruded by the T die is sandwiched between two metal rolls and cooled. Thereafter, the stacked molten resin is conveyed by a guide roll, and cut into a sheet-like flat plate by a sheet cutter machine to prepare a light diffusion sheet having a two-layer structure having an uneven shape on the surface.

The light diffusion sheet may be manufactured by shape transfer using ultraviolet (UV) as follows. First, an uncured ultraviolet curable resin is filled in a roll having an inverted shape of an uneven shape to be transferred, and a base material is pressed against the resin. Next, in a state where the roll filled with the ultraviolet curable resin and the base material are integrated, the resin is cured by irradiation with ultraviolet rays. Next, the sheet on which the uneven shape has been transferred by the resin is peeled off from the roll. Finally, the sheet is irradiated with ultraviolet rays again to completely cure the resin to produce a light diffusion sheet having an uneven shape on the surface.

Characteristics of Embodiment

The light diffusion sheet 43 according to the present embodiment is incorporated in the liquid crystal display device 50 in which the plurality of point light sources 42 is dispersedly provided on the back surface side of the display screen 50a. At least the first surface 21a of the light diffusion sheet 43 has the light diffuser 43A provided with the plurality of recesses 22 arrayed two-dimensionally and the plurality of luminance enhancers 43B that is flatter than the light diffuser 43A. The plurality of luminance enhancers 43B is provided in a gradation pattern such that the arrangement density is higher in a region where the luminance is lower in the luminance distribution generated by the plurality of point light sources 42 when the plurality of recesses 22 is formed all over the first surface 21a.

In the light diffusion sheet 43 according to the present embodiment, the luminance enhancer 43B that is flatter than the light diffuser 43A is provided in the region where the luminance decreases in the luminance distribution when the recesses 22 provided in the light diffuser 43A are formed on the entire surface of the sheet. In a portion where the luminance enhancer 43B is disposed, the light diffusibility is suppressed, and as a result, a proportion of a linear light traveling straight perpendicularly to the sheet surface increases. Consequently, the luminance in the region where the luminance decreases can be increased, and the luminance uniformity can be improved while the decrease in the luminance of the entire screen is avoided in the liquid crystal display device 50. Therefore, the light diffusion sheet 43 according to the present embodiment can also cope with further thinning of the backlight unit 40 and reduction in the number of point light sources 42 to be arranged.

In the light diffusion sheet 43 according to the present embodiment, the luminance enhancers 43B are provided in a gradation pattern so that the arrangement density is higher in a region where the luminance is lower in the luminance distribution. It is therefore easy to adjust the area, density, and the like of a portion where the proportion of the linear light is increased in accordance with the luminance distribution, and thus, the luminance uniformity can be further improved.

In the present disclosure, providing the luminance enhancers in a gradation pattern means changing the arrangement density of the luminance enhancers. The arrangement density of the luminance enhancers is an area ratio occupied by the luminance enhancers in a unit area. For example, in a case of dot-shaped gradation, the area ratio is calculated on the basis of multiplying "an area of one dot in the unit area" by "the number of dots in the unit area" (a plurality of dot sizes is also considered, if any). For example, in a case of line-shaped gradation, the area ratio is calculated on the basis of multiplying "an area of one line in the unit area" by "the number of lines in the unit area" (a plurality of line sizes is also considered, if any). For example, in a case of solid gradation, the area ratio is calculated on the basis of multiplying "an area of one solid in the unit area" by "the number of solids in the unit area" (a plurality of solid sizes is also considered, if any). The arrangement density of the luminance enhancers provided in a gradation pattern changes between 100% (completely solid) and 0%. The range of the arrangement density of 100% to 0% includes 100% and 0%, but a maximum value and a minimum value of the arrangement density of the luminance enhancers do not always need to be 100% and 0%. The change in the arrangement density may be a linear change or a curved change. The change in the arrangement density may be a change in one direction (for example, from 100% to 0%) such as a monotonous increase or a monotonous decrease, or may be a change accompanied by an increase or decrease (for example, from 100% to 50% to 70% to 0%). The "unit area" for representing the arrangement density of the luminance enhancers may be arbitrarily set.

In the light diffusion sheet 43 according to the present embodiment, the low luminance region R may be the inter-light source region between the adjacent point light sources 42. In this way, the luminance in the inter-light source region can be increased, and the luminance uniformity can be improved.

In the light diffusion sheet 43 according to the present embodiment, the low luminance region R may be the region immediately above the light source which is located immediately above the point light source 42. In this way, the luminance in the region immediately above the light source can be increased, and the luminance uniformity can be improved.

Note that, in the light diffusion sheet 43 according to the present embodiment, the recess 22 may be also formed in the arrangement region (low luminance region R) of the luminance enhancer 43B, and the luminance enhancer 43B may include the transparent member 23 provided in the recess 22 in the low luminance region R. In this way, the luminance enhancer 43B can be formed by providing the transparent member in the recess in the low luminance region R after forming the recesses 22 on the entire surface of the sheet. In this case, each of the transparent members 23 constituting the luminance enhancers 43B may fill at least one or more recesses 22 in the low luminance region R. As described above, the luminance enhancer 43B can be more easily formed when one transparent member 23 fills one or more recesses 22 than when a plurality of transparent members 23 is provided in one recess 22.

In the light diffusion sheet 43 according to the present embodiment, the recess 22 is not required to be formed in the arrangement region (low luminance region R) of the luminance enhancer 43B, and the luminance enhancer 43B may include the same material as the light diffuser 43A. In this way, the luminance enhancer 43B can be formed by processing using, for example, a mold, a shape roll, a laser, or the like without performing a step of providing the transparent member 23 in the recess 22.

In the light diffusion sheet 43 according to the present embodiment, the recess 22 may have an inverted polygonal pyramid shape, an inverted polygonal frustum shape, or a lower hemispherical shape. In this way, the light diffusibility of the light diffuser 43A can be improved.

The backlight unit 40 according to the present embodiment is incorporated in the liquid crystal display device 50, guides light emitted from the plurality of point light sources 42 toward the display screen 50a, and includes the light diffusion sheet 43 according to the present embodiment between the display screen 50a and the plurality of point light sources 42. It is therefore possible to improve the luminance uniformity while avoiding a decrease in luminance of the entire screen.

In the backlight unit 40 according to the present embodiment, the distance between the point light source 42 and the light diffusion sheet 43 (the light diffusion sheet 43 closest to the point light source 42 when a plurality of light diffusion sheets 43 are stacked) may be 2 mm or less. In such a configuration in which variation in luminance distribution easily occurs in the conventional light diffusion sheet, the luminance uniformity can be also improved. That is, the backlight unit 40 according to the present embodiment is a direct backlight unit in which a plurality of point light sources 42 is dispersedly arranged on the back surface side of the display screen 50a of the liquid crystal display device 50. Therefore, in order to downsize the liquid crystal display device 50, it is necessary to reduce the distance between the point light source 42 and the light diffusion sheet 43. However, when the distance is reduced, for example, a phenomenon (luminance unevenness) easily occurs in which the luminance of the display screen 50a of a portion located on the inter-light source region between the point light sources 42 dispersedly arranged becomes smaller than the luminance in the other portions. Meanwhile, the use of the light diffusion sheet 43 according to the present embodiment in which the luminance enhancer 43B is provided in the low luminance region R is useful for suppressing the luminance unevenness. In particular, in view of the future thickness reduction of a medium-to-small liquid crystal display device, when the distance between the point light source and the light diffusion sheet is set to 10 mm or less, preferably 5 mm or less, more preferably 2 mm or less, and ultimately 0 mm, it is considered that the usefulness of the light diffusion sheet 43 according to the present embodiment becomes more remarkable.

In the backlight unit 40 according to the present embodiment, the point light source 42 may be an LED element. In this way, the luminance of the entire screen can be sufficiently obtained even if the number of light sources is reduced.

In the backlight unit 40 according to the present embodiment, the point light source 42 may be disposed on the reflecting member 41 provided on the opposite side of the display screen 50a as viewed from the light diffusion sheet 43. In this way, the luminance uniformity is further improved.

Since the liquid crystal display device 50 according to the present embodiment includes the backlight unit 40 according to the present embodiment and the liquid crystal display panel 5, the luminance uniformity can be improved while a decrease in luminance of the entire screen is avoided. In the information apparatus including the liquid crystal display device 50 according to the present embodiment, a similar effect can be obtained.

The method for manufacturing the light diffusion sheet 43 according to the present embodiment includes the step A of calculating the luminance distribution generated by the plurality of point light sources 42 when the plurality of recesses 22 is formed all over the first surface 21a, the step B of forming the light diffuser 43A on the first surface 21a, and the step C of forming the luminance enhancer 43B on the first surface 21a in a gradation pattern so that the arrangement density is higher in a region where the luminance is lower in the luminance distribution calculated in the step A.

In the method for manufacturing the light diffusion sheet 43 according to the present embodiment, the luminance enhancer 43B that is flatter than the light diffuser 43A is provided in the region where the luminance decreases in the luminance distribution when the recesses 22 provided in the light diffuser 43A are formed on the entire surface of the sheet. In a portion where the luminance enhancer 43B is disposed, the light diffusibility is suppressed, and as a result, a proportion of a linear light traveling straight perpendicularly to the sheet surface increases. Consequently, the luminance in the region where the luminance decreases can be increased, and the luminance uniformity can be improved while the decrease in the luminance of the entire screen is avoided in the liquid crystal display device 50. Therefore, it is also possible to cope with further thinning of the backlight unit 40 and reduction in the number of point light sources 42 to be arranged.

In the method for manufacturing the light diffusion sheet 43 according to the present embodiment, the luminance enhancers 43B are provided in a gradation pattern so that the arrangement density is higher in a region where the luminance is lower in the luminance distribution. It is therefore easy to adjust the area, density, and the like of a portion where the proportion of the linear light is increased in accordance with the luminance distribution, and thus, the luminance uniformity can be further improved.

In the method for manufacturing the light diffusion sheet 43 according to the present embodiment, the step B may include a step of forming the recess 22 in the arrangement region (low luminance region R) of the luminance enhancer 43B, and the step C may include a step of forming the luminance enhancer 43B by providing the transparent member 23 in the recess 22 in the low luminance region R after the step B. In this way, the luminance enhancer 43B can be formed by providing the transparent member in the recess 22 in the low luminance region R after forming the recesses 22 on the entire surface of the sheet.

In the method for manufacturing the light diffusion sheet 43 according to the present embodiment, the step B and the step C may be performed simultaneously. The number of steps can be reduced by simultaneously performing the step B and the step C by processing using, for example, a mold, a shape roll, a laser, or the like.

EXAMPLES

Figure 11:
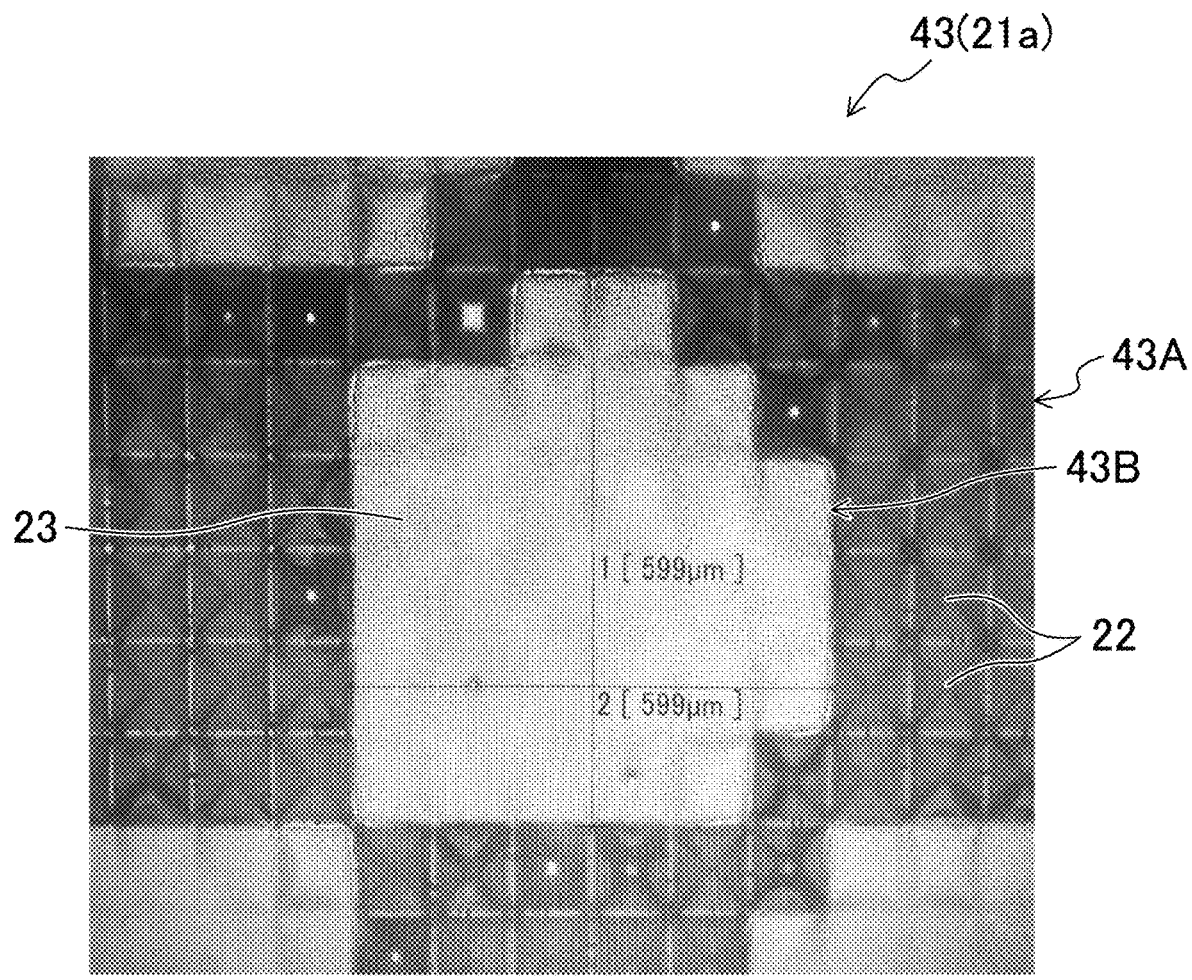
FIG. 11 is a photograph showing a planar configuration of a light diffusion sheet according to an example.

Hereinafter, examples will be described with reference to the drawings. FIG. 11 is a photograph showing a planar configuration of a part of the light diffusion sheet 43 according to the example, and FIG. 12 is a diagram showing a surface shape (change in height of the first surface 21a) of a part of the light diffusion sheet 43 of the example.

Figure 12:
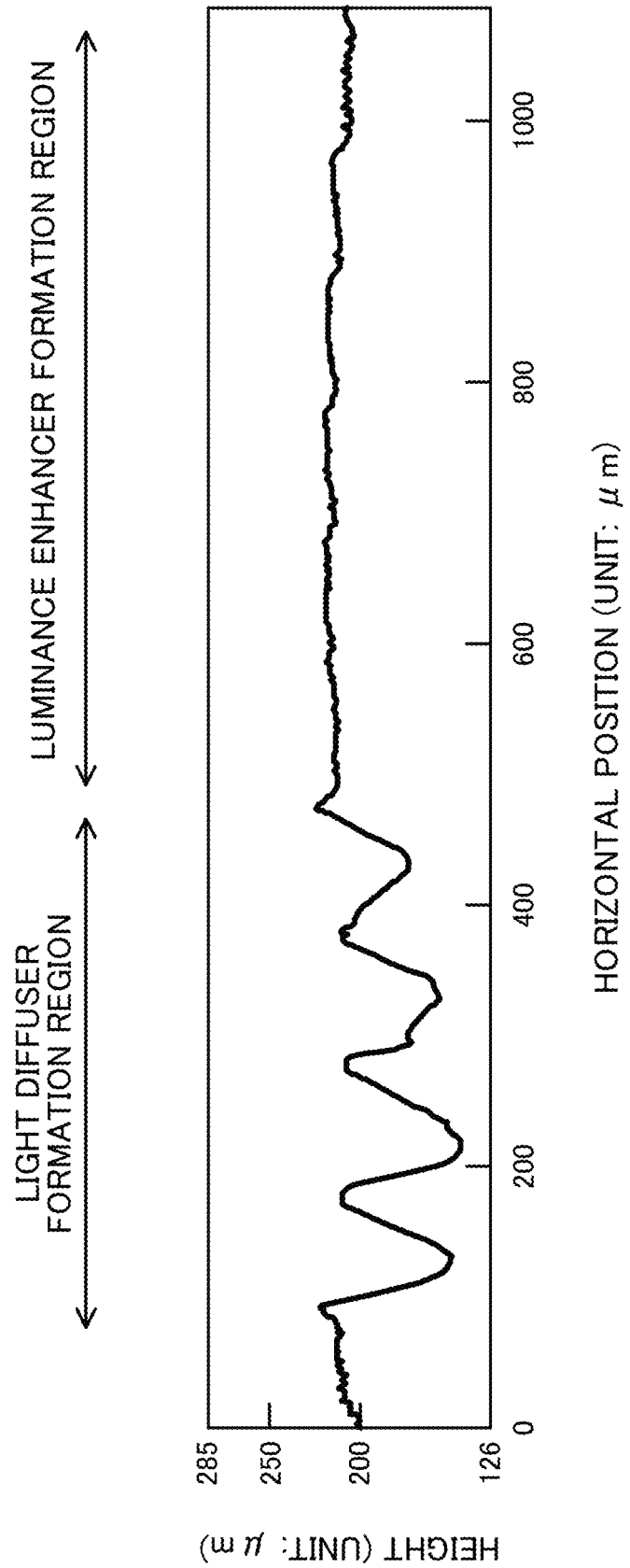
FIG. 12 is a diagram illustrating a surface shape of a light diffusion sheet according to the example.

As illustrated in FIGS. 11 and 12, the light diffusion sheet 43 of the example includes the base material layer 21 including polycarbonate and having a thickness of 200 µm, and includes, on the first surface 21a, the light diffuser 43A in which the recesses 22 each having a recessed pyramid shape are arrayed two-dimensionally, and the luminance enhancer 43B that is flatter than the light diffuser 43A. The second surface 21b of the light diffusion sheet 43 is a flat surface. In the light diffusion sheet 43, polycarbonate to be the base material layer 21 was processed by extrusion molding, and the recesses 22 each having a recessed pyramid shape having an apex angle of 90° and a depth of 50 µm were two-dimensionally arrayed on the entire surface of the first surface 21a at a pitch of 100 µm. The luminance enhancer 43B was formed by disposing a transparent member 23 including a transparent ink in a dot shape on the first surface 21a by using a patterning plate having an opening with a diameter of 600 µm. Each of the dot-shaped transparent members 23 was embedded across the plurality of recesses 22.

In the light diffusion sheet 43 of the example, the luminance enhancers 43B are arranged in the pattern illustrated in FIG. 6. As a comparative example, the light diffusion sheet 43 in which the luminance enhancers 43B were arranged in the pattern illustrated in FIG. 7 was prepared. For the light diffusion sheet 43 of the example, the luminance distribution along line VI-VI in FIG. 6 was measured. For the light diffusion sheet 43 of the comparative example, the luminance distribution along line VII-VII in FIG. 7 was measured. In each measurement, the sheet laminate 100 illustrated in FIG. 2 including the light diffusion sheet 43 was formed, the point light source 42 including an LED element was disposed below the sheet laminate 100, and the luminance of light passing through the sheet laminate 100 was examined. Specifically, the sheet laminate 100 including the light diffusion sheet 43 was disposed on the point light source 42 (LED array), a transparent glass plate was placed on the sheet laminate 100 in order to suppress floating of the sheets, and the luminance upward in a vertical direction (direction from the LED array toward the glass plate) was measured with a two-dimensional color luminance meter UA-200 manufactured by TOPCON TECHNOHOUSE CORPORATION.

Figure 13:
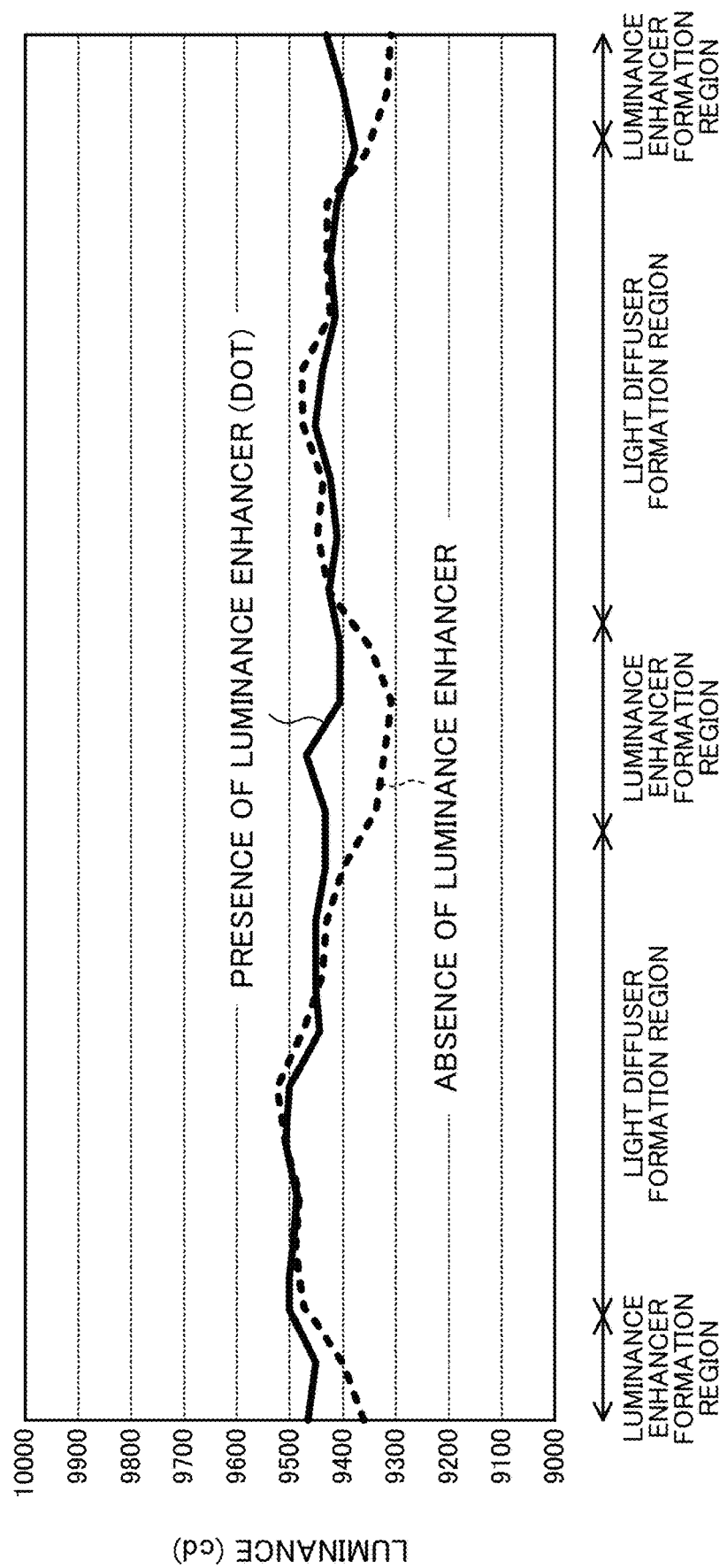
FIG. 13 is a diagram illustrating luminance distribution of the light diffusion sheet according to the example.

FIGS. 13 and 14 illustrate luminance distributions obtained for the light diffusion sheet 43 of the example and the light diffusion sheet 43 of the comparative example, respectively. In FIGS. 13 and 14, the luminance distribution indicated by a solid line is the luminance distribution of the light diffusion sheet 43 in which the luminance enhancer 43B is formed, and the luminance distribution indicated by a broken line indicates the luminance distribution of the light diffusion sheet 43 in a state before the luminance enhancer 43B is formed.

In the light diffusion sheet 43 of the example, the luminance enhancers 43B are provided in a gradation pattern so that the arrangement density is higher in a region where the luminance is lower in the luminance distribution indicated by the broken line in FIG. 13 (see FIG. 6). It is therefore easy to adjust the area, density, and the like of a portion where the proportion of the linear light is increased in accordance with the luminance distribution illustrated in the broken line in FIG. 13, and thus, excellent luminance uniformity was obtained.

On the other hand, in the light diffusion sheet 43 of the comparative example, the solid luminance enhancers 43B are provided in a region where the luminance is lower in the luminance distribution indicated by the broken line in FIG. 14 (see FIG. 7). Therefore, although a luminance enhancement effect by the luminance enhancer 43B can be obtained, the area, density, and the like of a portion where the proportion of the linear light is increased cannot be finely adjusted, and thus the luminance uniformity is deteriorated as compared with the example illustrated in FIG. 13.

Other Embodiments

The embodiment of the present disclosure (including examples) has been described above. However, the present disclosure is not limited to the above embodiment, and various modifications can be made within the scope of the disclosure. That is, the description of the above embodiment is merely exemplary in nature, and is not intended to limit the present disclosure, its application, or its use.

The invention claimed is:

1. A backlight unit comprising a plurality of point light sources and a light diffusion sheet, wherein
   the light diffusion sheet has: a first surface to be one of a light emission surface or a light incident surface; and a second surface that is located on an opposite side of the first surface and is to be an other of the light emission surface or the light incident surface,
   the plurality of point light sources is disposed to face the light incident surface,
   at least the first surface of the light diffusion sheet includes a light diffuser provided with a plurality of recesses arrayed in a two-dimensional matrix, and a plurality of luminance enhancers that is flatter than the light diffuser, and
   the plurality of luminance enhancers is provided in a gradation pattern such that an arrangement density is higher in a region where a luminance is lower in a luminance distribution generated by the plurality of point light sources when the plurality of recesses is formed all over the first surface.

2. The backlight unit according to claim 1, wherein the region where the luminance is lower is a region between adjacent point light sources among the plurality of point light sources.

3. The backlight unit according to claim 1, wherein the region where the luminance is lower is a region immediately above the plurality of point light sources.

4. The backlight unit according to claim 1, wherein
the plurality of recesses is also formed in an arrangement region of the plurality of luminance enhancers, and
the plurality of luminance enhancers includes transparent members provided in the plurality of recesses in the arrangement region.

5. The backlight unit according to claim 4, wherein each of the transparent members constituting the plurality of luminance enhancers fills at least one or more of the plurality of recesses in the arrangement region.

6. The backlight unit according to claim 1, wherein
the plurality of recesses is not formed in an arrangement region of the plurality of luminance enhancers, and
the plurality of luminance enhancers includes a same material as the light diffuser.

7. The backlight unit according to claim 1, wherein the plurality of recesses has an inverted polygonal pyramid shape, an inverted polygonal frustum shape, or a lower hemispherical shape.

8. The backlight unit according to claim 1, wherein a distance between the plurality of point light sources and the light diffusion sheet is 2 mm or less.

9. The backlight unit according to claim 1, wherein the plurality of point light sources is an LED element.

10. The backlight unit according to claim 1, wherein the plurality of point light sources is disposed on a reflecting member provided on an opposite side of the display screen as viewed from the light diffusion sheet.

11. A liquid crystal display device comprising:
the backlight unit according to claim 1; and
a liquid crystal display panel.

12. An information apparatus comprising the liquid crystal display device according to claim 11.

13. A method for manufacturing a backlight unit comprising a plurality of point light sources and a light diffusion sheet, wherein
the light diffusion sheet has: a first surface to be one of a light emission surface or a light incident surface; and a second surface that is located on an opposite side of the first surface and is to be an other of the light emission surface or the light incident surface,
the plurality of point light sources is disposed to face the light incident surface, and
at least the first surface of the light diffusion sheet includes a light diffuser provided with a plurality of recesses in a two-dimensional matrix, and a plurality of luminance enhancers that is flatter than the light diffuser,
the method comprising:
a step A of calculating a luminance distribution generated by the plurality of point light sources when the plurality of recesses is formed all over the first surface;
a step B of forming the light diffuser on the first surface; and
a step C of forming the plurality of luminance enhancers on the first surface in a gradation pattern such that an arrangement density is higher in a region where a luminance is lower in the luminance distribution calculated in the step A.

14. The method for manufacturing a backlight unit according to claim 13, wherein
the step B includes a step of forming the plurality of recesses in an arrangement region of the plurality of luminance enhancers, and
the step C includes a step of forming the plurality of luminance enhancers by providing a transparent member in the plurality of recesses in the arrangement region after the step B.

15. The method for manufacturing a backlight unit according to claim 13, wherein the step B and the step C are performed simultaneously.

* * * * *